US008557940B2

(12) United States Patent
Chang et al.

(10) Patent No.: US 8,557,940 B2
(45) Date of Patent: Oct. 15, 2013

(54) AMPHIPHILIC POLYSILOXANE PREPOLYMERS AND USES THEREOF

(75) Inventors: Frank Chang, Suwanee, GA (US);
Robert Scott, Alpharetta, GA (US);
Jinyu Huang, Suwanee, GA (US);
Arturo N. Medina, Suwanee, GA (US);
Dawn A. Smith, Cullman, AL (US);
Laura Ann Sanders, Decatur, GA (US);
John Dallas Pruitt, Suwanee, GA (US)

(73) Assignee: Novartis AG, Basel (CH)

( * ) Notice: Subject to any disclaimer, the term of this patent is extended or adjusted under 35 U.S.C. 154(b) by 166 days.

(21) Appl. No.: 13/193,642

(22) Filed: Jul. 29, 2011

(65) Prior Publication Data

US 2012/0029111 A1  Feb. 2, 2012

Related U.S. Application Data

(60) Provisional application No. 61/369,109, filed on Jul. 30, 2010.

(51) Int. Cl.
*C08F 30/08* (2006.01)
(52) U.S. Cl.
USPC ........................................ 526/279; 351/160 R
(58) Field of Classification Search
USPC ........................................ 526/279; 351/160 R
See application file for complete search history.

(56) References Cited

U.S. PATENT DOCUMENTS

| | | |
|---|---|---|
| 3,356,758 A | 12/1967 | Omietanski |
| 3,384,599 A | 5/1968 | Omietanski |
| 3,445,419 A | 5/1969 | Vanderlinde |
| 3,661,744 A | 5/1972 | Kehr |
| 3,867,420 A | 2/1975 | Morehouse |
| 4,008,341 A | 2/1977 | Kehr |
| 4,031,271 A | 6/1977 | Bush |
| 4,042,552 A | 8/1977 | Grucza |
| 4,045,547 A | 8/1977 | Le Boeuf |
| 4,119,617 A | 10/1978 | Hanyuda |
| 4,120,721 A | 10/1978 | Ketley |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,229,273 A | 10/1980 | Wajs |
| 4,245,069 A | 1/1981 | Covington |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,284,539 A | 8/1981 | Homan |
| 4,289,867 A | 9/1981 | Martin |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert |
| 4,444,711 A | 4/1984 | Schad |
| 4,460,534 A | 7/1984 | Boehm |
| 4,467,082 A | 8/1984 | Shirahata |
| 4,485,236 A | 11/1984 | Rasmussen |
| 4,486,577 A | 12/1984 | Mueller |
| 4,543,398 A | 9/1985 | Bany |
| 4,605,712 A | 8/1986 | Mueller |
| 4,632,844 A | 12/1986 | Yanagihara |
| 4,661,575 A | 4/1987 | Tom |
| 4,666,953 A | 5/1987 | Klemarczyk |
| 4,684,538 A | 8/1987 | Klemarczyk |
| 4,703,097 A | 10/1987 | Wingler |
| 4,711,943 A | 12/1987 | Harvey, III |
| 4,780,515 A | 10/1988 | Deichert |
| 4,833,218 A | 5/1989 | Lee |
| 4,837,289 A | 6/1989 | Mueller |
| 4,952,711 A | 8/1990 | Jacobine |
| 4,954,586 A | 9/1990 | Toyoshima |
| 4,954,587 A | 9/1990 | Mueller |
| 4,983,702 A | 1/1991 | Mueller |
| 5,010,141 A | 4/1991 | Mueller |

(Continued)

FOREIGN PATENT DOCUMENTS

| | | | |
|---|---|---|---|
| EP | 0216074 | A2 | 4/1987 |
| EP | 0229033 | A2 | 7/1987 |
| EP | 0331633 | A2 | 9/1989 |
| EP | 0379146 | A2 | 1/1990 |
| EP | 0395583 | A2 | 4/1990 |
| EP | 0425436 | A2 | 5/1991 |
| EP | 0584764 | A1 | 3/1994 |
| EP | 0584826 | A2 | 3/1994 |
| EP | 0677561 | A1 | 10/1995 |
| EP | 0958315 | B1 | 6/2001 |

(Continued)

OTHER PUBLICATIONS

Haun et al, "Synthesis and Properties of Polydimethylsiloxane-Containing Block Copolymers via Living Free Radical Polymerization", Journal of Polymer Science, Part A: Polymer Chemistry (2001) 39, 1833-1842.

(Continued)

*Primary Examiner* — Margaret Moore
(74) *Attorney, Agent, or Firm* — Jian Zhou

(57) ABSTRACT

The present invention provides an amphiphilic polysiloxane prepolymer which comprises hydrophilic monomeric units derived from at least one hydrophilic vinylic monomer, polysiloxane crosslinking units derived from at least one polysiloxane crosslinker having at least two terminal ethylenically-unsaturated groups, dangling polysiloxane chains each of which is terminated with one ethylenically unsaturated group, and chain-transfer units derived from a chain transfer agent other than a RAFT agent. A prepolymer of the invention is suitable for making hydrogel contact lenses. The present invention is also related to hydrogel contact lenses made from an amphiphilic polysiloxane prepolymer of the invention and to processes for preparing an amphiphilic polysiloxane prepolymer of the invention and for making silicone hydrogel contact lenses.

15 Claims, No Drawings

(56) References Cited

U.S. PATENT DOCUMENTS

| | | | |
|---|---|---|---|
| 5,034,461 | A | 7/1991 | Lai |
| 5,036,139 | A | 7/1991 | Spinelli |
| 5,039,761 | A | 8/1991 | Ono |
| 5,070,169 | A | 12/1991 | Robertson |
| 5,070,170 | A | 12/1991 | Robertson |
| 5,070,215 | A | 12/1991 | Bambury |
| 5,079,319 | A | 1/1992 | Mueller |
| 5,100,929 | A | 3/1992 | Jochum |
| 5,164,462 | A | 11/1992 | Yang |
| 5,194,556 | A | 3/1993 | Mueller |
| 5,198,477 | A | 3/1993 | von der Haegen |
| 5,219,965 | A | 6/1993 | Valint, Jr. |
| 5,224,957 | A | 7/1993 | Gasser |
| 5,227,432 | A | 7/1993 | Jung |
| 5,244,981 | A | 9/1993 | Seidner |
| 5,312,575 | A | 5/1994 | Wills |
| 5,314,960 | A | 5/1994 | Spinelli |
| 5,314,961 | A | 5/1994 | Anton |
| 5,331,067 | A | 7/1994 | Seidner |
| 5,336,797 | A | 8/1994 | McGee |
| 5,346,946 | A | 9/1994 | Yokoyama |
| 5,352,753 | A | 10/1994 | Yang |
| 5,358,976 | A | 10/1994 | Dowling |
| 5,358,995 | A | 10/1994 | Lai |
| 5,371,181 | A | 12/1994 | Glaser |
| 5,376,637 | A | 12/1994 | Sawai |
| 5,387,632 | A | 2/1995 | Lai |
| 5,387,663 | A | 2/1995 | McGee |
| 5,416,132 | A | 5/1995 | Yokoyama |
| 5,426,158 | A | 6/1995 | Mueller |
| 5,449,729 | A | 9/1995 | Lai |
| 5,451,617 | A | 9/1995 | Lai |
| 5,466,768 | A | 11/1995 | Yang |
| 5,480,927 | A | 1/1996 | Janssen |
| 5,486,579 | A | 1/1996 | Lai |
| 5,489,474 | A | 2/1996 | Shinoda |
| 5,505,884 | A | 4/1996 | Burke |
| 5,508,317 | A | 4/1996 | Muller |
| 5,512,205 | A | 4/1996 | Lai |
| 5,527,925 | A | 6/1996 | Chabrecek |
| 5,559,163 | A | 9/1996 | Dawson |
| 5,563,184 | A | 10/1996 | McGee |
| 5,583,163 | A | 12/1996 | Müller |
| 5,583,463 | A | 12/1996 | Merritt |
| 5,612,389 | A | 3/1997 | Chabrecek |
| 5,612,391 | A | 3/1997 | Chabrecek |
| 5,620,684 | A | 4/1997 | Dupuis |
| 5,621,018 | A | 4/1997 | Chabrecek |
| 5,637,726 | A | 6/1997 | Collins |
| 5,663,288 | A | 9/1997 | Shinoda |
| 5,665,840 | A | 9/1997 | Pohlmann |
| 5,681,871 | A | 10/1997 | Molock |
| 5,708,094 | A | 1/1998 | Lai |
| 5,712,356 | A | 1/1998 | Bothe |
| 5,723,512 | A | 3/1998 | Leppard |
| 5,729,322 | A | 3/1998 | Collins |
| 5,760,100 | A | 6/1998 | Nicolson |
| 5,767,169 | A | 6/1998 | Leppard |
| 5,789,464 | A | 8/1998 | Muller |
| 5,807,944 | A | 9/1998 | Hirt |
| 5,843,346 | A | 12/1998 | Morrill |
| 5,849,810 | A | 12/1998 | Muller |
| 5,849,811 | A | 12/1998 | Nicolson |
| 5,849,841 | A | 12/1998 | Mühlebach |
| 5,866,635 | A | 2/1999 | Collins |
| 5,891,615 | A | 4/1999 | Winslow |
| 5,894,002 | A | 4/1999 | Boneberger |
| 5,914,355 | A | 6/1999 | Künzler |
| 5,936,052 | A | 8/1999 | Bothe |
| 5,959,117 | A | 9/1999 | Ozark |
| 5,960,100 | A | 9/1999 | Hargrove |
| 5,962,548 | A | 10/1999 | Vanderlaan |
| 5,965,776 | A | 10/1999 | Leppard |
| 5,981,615 | A | 11/1999 | Meijs |
| 5,981,669 | A | 11/1999 | Valint, Jr. |
| 5,981,675 | A | 11/1999 | Valint, Jr. |
| 5,989,462 | A | 11/1999 | Buazza |
| 5,998,498 | A | 12/1999 | Vanderlaan |
| 6,015,842 | A | 1/2000 | LeBoeuf |
| 6,015,874 | A | 1/2000 | Hiratani |
| 6,020,445 | A | 2/2000 | Vanderlaan |
| 6,020,528 | A | 2/2000 | Leppard |
| 6,036,891 | A | 3/2000 | Liao |
| 6,039,913 | A | 3/2000 | Hirt |
| 6,043,328 | A | 3/2000 | Domschke |
| 6,096,846 | A | 8/2000 | Oda |
| 6,136,880 | A | 10/2000 | Snowwhite |
| 6,149,692 | A | 11/2000 | Lally |
| 6,153,760 | A | 11/2000 | Künzler |
| 6,162,844 | A | 12/2000 | Lally |
| 6,165,408 | A | 12/2000 | Steinmann |
| 6,197,842 | B1 | 3/2001 | Marchin |
| 6,204,306 | B1 | 3/2001 | Chabrecek |
| 6,218,463 | B1 | 4/2001 | Molock |
| 6,218,507 | B1 | 4/2001 | Gao |
| 6,221,303 | B1 | 4/2001 | Steinmann |
| 6,252,032 | B1 | 6/2001 | Van Antwerp |
| 6,284,813 | B1 | 9/2001 | Leppard |
| 6,303,687 | B1 | 10/2001 | Müller |
| 6,310,215 | B1 | 10/2001 | Iwamoto |
| 6,312,706 | B1 | 11/2001 | Lai |
| 6,329,485 | B1 | 12/2001 | Vanderbilt |
| 6,342,570 | B1 | 1/2002 | Bothe |
| 6,359,024 | B2 | 3/2002 | Lai |
| 6,359,025 | B1 | 3/2002 | Snowwhite |
| 6,361,925 | B1 | 3/2002 | Leppard |
| 6,367,929 | B1 | 4/2002 | Maiden |
| 6,376,568 | B1 | 4/2002 | Baudin |
| 6,444,776 | B1 | 9/2002 | Holland |
| 6,451,871 | B1 | 9/2002 | Winterton |
| 6,465,538 | B2 | 10/2002 | Lai |
| 6,472,489 | B1 | 10/2002 | Stockinger |
| 6,479,587 | B1 | 11/2002 | Stockinger |
| 6,481,871 | B2 | 11/2002 | Jamison |
| 6,492,478 | B1 | 12/2002 | Steinmann |
| 6,596,294 | B2 | 7/2003 | Lai |
| 6,627,124 | B1 | 9/2003 | Herbrechtsmeier |
| 6,638,991 | B2 | 10/2003 | Baba |
| 6,657,029 | B2 | 12/2003 | Vanderbilt |
| 6,657,030 | B2 | 12/2003 | Vanderbilt |
| 6,657,032 | B2 | 12/2003 | Vanderbilt |
| 6,669,873 | B1 | 12/2003 | Smith |
| 6,673,886 | B2 | 1/2004 | Vanderbilt |
| 6,693,141 | B2 | 2/2004 | Baudin |
| 6,713,583 | B2 | 3/2004 | Liao |
| 6,719,929 | B2 | 4/2004 | Winterton |
| 6,762,264 | B2 | 7/2004 | Kunzler |
| 6,765,083 | B2 | 7/2004 | Ford |
| 6,776,934 | B2 | 8/2004 | Lai |
| 6,793,973 | B2 | 9/2004 | Winterton |
| 6,800,225 | B1 | 10/2004 | Hagmann |
| 6,811,804 | B2 | 11/2004 | Patel |
| 6,811,805 | B2 | 11/2004 | Gilliard |
| 6,822,016 | B2 | 11/2004 | McCabe |
| 6,849,671 | B2 | 2/2005 | Steffen |
| 6,852,353 | B2 | 2/2005 | Qiu |
| 6,852,793 | B2 | 2/2005 | Salamone |
| 6,858,218 | B2 | 2/2005 | Lai |
| 6,884,457 | B2 | 4/2005 | Gilliard |
| 6,896,926 | B2 | 5/2005 | Qiu |
| 6,926,965 | B2 | 8/2005 | Qiu |
| 6,940,580 | B2 | 9/2005 | Winterton |
| 6,943,203 | B2 | 9/2005 | Vanderlaan |
| 6,995,192 | B2 | 2/2006 | Phelan |
| 7,040,756 | B2 | 5/2006 | Qiu |
| 7,052,131 | B2 | 5/2006 | McCabe |
| 7,071,274 | B2 | 7/2006 | Fujisawa |
| 7,078,074 | B2 | 7/2006 | Matsuzawa |
| 7,091,283 | B2 | 8/2006 | Muller |
| 7,112,641 | B2 | 9/2006 | Fujisawa |
| 7,160,953 | B2 | 1/2007 | Bowers |
| 7,214,809 | B2 | 5/2007 | Zanini |
| 7,238,750 | B2 | 7/2007 | Muller |
| 7,247,692 | B2 | 7/2007 | Laredo |

(56) References Cited

U.S. PATENT DOCUMENTS

| | | |
|---|---|---|
| 7,249,848 B2 | 7/2007 | Laredo |
| 7,256,246 B2 | 8/2007 | Kindt-Larsen |
| 7,268,189 B2 | 9/2007 | Muller |
| 7,279,507 B2 | 10/2007 | Hu |
| 7,384,590 B2 | 6/2008 | Kelly |
| 7,387,759 B2 | 6/2008 | Kelly |
| 7,396,890 B2 | 7/2008 | Zanini |
| 7,416,737 B2 | 8/2008 | Alvarez-Carrigan |
| 7,423,108 B2 | 9/2008 | Kunzler |
| 7,461,937 B2 | 12/2008 | Steffen |
| 7,468,397 B2 | 12/2008 | Schorzman |
| 7,521,488 B2 | 4/2009 | Steffen |
| 7,521,519 B1 | 4/2009 | Hirt |
| 7,550,519 B2 | 6/2009 | Phelan |
| 7,566,754 B2 | 7/2009 | Müller |
| 7,649,058 B2 | 1/2010 | McCabe |
| 7,666,921 B2 | 2/2010 | McCabe |
| 7,691,916 B2 | 4/2010 | McCabe |
| 7,942,929 B2 | 5/2011 | Linhardt |
| 8,003,710 B2 | 8/2011 | Medina |
| 8,383,744 B2 * | 2/2013 | Justynska et al. ............. 526/279 |
| 2001/0037001 A1 | 11/2001 | Muller |
| 2002/0042022 A1 | 4/2002 | Leppard |
| 2002/0107297 A1 | 8/2002 | Baudin |
| 2002/0107324 A1 | 8/2002 | Vanderlaan |
| 2002/0198280 A1 | 12/2002 | Baba |
| 2003/0044447 A1 | 3/2003 | Zanini |
| 2003/0125498 A1 | 7/2003 | McCabe |
| 2003/0162862 A1 | 8/2003 | McCabe |
| 2004/0082680 A1 | 4/2004 | Phelan |
| 2004/0115242 A1 | 6/2004 | Meyers |
| 2004/0150788 A1 | 8/2004 | Andersson |
| 2004/0151755 A1 | 8/2004 | Rathore |
| 2004/0178541 A1 | 9/2004 | Kelly |
| 2004/0186248 A1 | 9/2004 | Vanderlaan |
| 2004/0209973 A1 | 10/2004 | Steffen |
| 2004/0213827 A1 | 10/2004 | Enns |
| 2005/0055090 A1 | 3/2005 | Lai |
| 2005/0113549 A1 | 5/2005 | Devlin |
| 2005/0117112 A1 | 6/2005 | Nayiby |
| 2005/0154080 A1 | 7/2005 | McCabe |
| 2005/0159502 A1 | 7/2005 | Steffen |
| 2005/0179862 A1 | 8/2005 | Steffen |
| 2005/0209402 A1 | 9/2005 | Ziegler |
| 2005/0237483 A1 | 10/2005 | Phelan |
| 2005/0260249 A1 | 11/2005 | Neely |
| 2006/0007391 A1 | 1/2006 | McCabe |
| 2006/0036052 A1 | 2/2006 | Kindt-Larsen |
| 2006/0069178 A1 | 3/2006 | Rastogi |
| 2006/0128826 A1 | 6/2006 | Ellison |
| 2006/0160957 A1 | 7/2006 | Muller |
| 2006/0235162 A1 | 10/2006 | Muller |
| 2006/0252850 A1 | 11/2006 | Jani |
| 2007/0010634 A1 | 1/2007 | Ziegler |
| 2007/0043140 A1 | 2/2007 | Lorenz |
| 2007/0092830 A1 | 4/2007 | Lai |
| 2007/0092831 A1 | 4/2007 | Lai |
| 2007/0138692 A1 | 6/2007 | Ford |
| 2007/0142551 A1 | 6/2007 | Kunzler |
| 2007/0142584 A1 | 6/2007 | Schorzman |
| 2007/0160643 A1 | 7/2007 | Schorzman |
| 2007/0160649 A1 | 7/2007 | Schorzman |
| 2007/0161810 A1 | 7/2007 | Schorzman |
| 2007/0229757 A1 | 10/2007 | McCabe |
| 2007/0242215 A1 | 10/2007 | Schorzman |
| 2008/0000201 A1 | 1/2008 | Schorzman |
| 2008/0004413 A1 | 1/2008 | Schorzman |
| 2008/0004414 A1 | 1/2008 | Schorzman |
| 2008/0015282 A1 | 1/2008 | McCabe |
| 2008/0015315 A1 | 1/2008 | Chang |
| 2008/0021127 A1 | 1/2008 | Muller |
| 2008/0076897 A1 | 3/2008 | Kunzler |
| 2008/0092830 A1 | 4/2008 | Suzuki |
| 2008/0143003 A1 | 6/2008 | Phelan |
| 2008/0143958 A1 | 6/2008 | Medina |
| 2008/0174035 A1 | 7/2008 | Winterton |
| 2008/0231798 A1 | 9/2008 | Zhou |
| 2008/0234457 A1 | 9/2008 | Zhou |
| 2008/0274207 A1 | 11/2008 | Nayiby |
| 2008/0299179 A1 | 12/2008 | Rathore |
| 2008/0316424 A1 | 12/2008 | McCabe |
| 2009/0005528 A1 | 1/2009 | Fujisawa |
| 2009/0059164 A1 | 3/2009 | Steffen |
| 2009/0091704 A1 | 4/2009 | Steffen |
| 2009/0143499 A1 | 6/2009 | Chang |
| 2009/0162763 A1 | 6/2009 | Li |
| 2009/0171026 A1 | 7/2009 | Fujisawa |
| 2009/0230575 A1 | 9/2009 | Liu |
| 2009/0252868 A1 | 10/2009 | Phelan |
| 2009/0276042 A1 | 11/2009 | Hughes |
| 2010/0084775 A1 | 4/2010 | McCabe |
| 2010/0120938 A1 | 5/2010 | Phelan |
| 2010/0120939 A1 | 5/2010 | Phelan |
| 2010/0133710 A1 | 6/2010 | McCabe |
| 2010/0144958 A1 * | 6/2010 | Findlay et al. ................ 524/548 |
| 2010/0152084 A1 | 6/2010 | Rathore |
| 2010/0168359 A1 | 7/2010 | Domschke |
| 2010/0168852 A1 * | 7/2010 | Vanderbilt et al. ........... 623/6.62 |
| 2010/0258961 A1 | 10/2010 | Chang |
| 2010/0259861 A1 | 10/2010 | Wendt |
| 2010/0296049 A1 | 11/2010 | Justynska |
| 2011/0269869 A1 | 11/2011 | Medina |

FOREIGN PATENT DOCUMENTS

| | | |
|---|---|---|
| EP | 0932635 B1 | 7/2001 |
| EP | 0961941 B1 | 4/2002 |
| EP | 1477511 A1 | 11/2004 |
| EP | 1754728 B1 | 2/2010 |
| GB | 2292740 A | 3/1996 |
| GB | 2310855 A | 9/1997 |
| JP | 7-179795 A | 7/1995 |
| JP | 2004307539 A | 11/2004 |
| WO | 9209421 A2 | 6/1992 |
| WO | 9218548 A1 | 10/1992 |
| WO | 9309084 A1 | 5/1993 |
| WO | 9323773 A1 | 11/1993 |
| WO | 9628762 A1 | 9/1996 |
| WO | 9631791 A1 | 10/1996 |
| WO | 9700274 A1 | 1/1997 |
| WO | 9805690 A1 | 2/1998 |
| WO | 9825982 A1 | 6/1998 |
| WO | 9933894 A1 | 7/1999 |
| WO | 0031150 A1 | 6/2000 |
| WO | 0059970 A1 | 10/2000 |
| WO | 0107523 A1 | 2/2001 |
| WO | 0171392 A1 | 9/2001 |
| WO | 2006055409 A2 | 5/2006 |
| WO | 2007128051 A1 | 11/2007 |
| WO | 2007146137 A2 | 12/2007 |
| WO | 2007146299 A2 | 12/2007 |
| WO | 2007146312 A2 | 12/2007 |
| WO | 2008008752 A2 | 1/2008 |
| WO | 2008116131 A2 | 9/2008 |

OTHER PUBLICATIONS

Banez, et al, "Synthesis and Solution Properties of Dimethylsiloxane-2-(Dimethylamino)ethyl Methacrylate Block Copolymers", Macromolecules (2000) 33, 451-456.

International Search Report dated Dec. 16, 2011 in International Application PCT/US11/45809, International filed Jul. 29, 2011.

Written Opinion of the International Searching Authority dated Dec. 16, 2011 in International Application PCT/US11/45809, International filed Jul. 29, 2011.

* cited by examiner

AMPHIPHILIC POLYSILOXANE PREPOLYMERS AND USES THEREOF

This application claims the benefit under 35 USC §119 (e) of U.S. provisional application No. 61/369,109 filed Jul. 30, 2010, incorporated by reference in its entirety.

The present invention is related to a class of amphiphilic polysiloxane prepolymers suitable for making hydrogel contact lenses. The present invention is also related to hydrogel contact lenses made from an amphiphilic polysiloxane prepolymer of the invention and to processes for preparing an amphiphilic polysiloxane prepolymer of the invention and for making silicone hydrogel contact lenses.

BACKGROUND

Currently, commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision), as illustrated in U.S. Pat. Nos. 5,508,317, 5,789,464, 5,849,810, and 6,800,225, which are incorporated by reference in their entireties. The Lightstream Technology™ involves reusable molds produced in high precision and curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

In order to apply the Lightstream Technology™ in making silicone hydrogel contact lenses, silicone-containing prepolymers have been developed, as described in U.S. Pat. Nos. 6,039,913, 6,043,328, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Ser. Nos. 12/313,546, 12/616,166 and 12/616,169, which are incorporated by reference in their entireties. However, those types of prepolymers disclosed in the above patents and patent applications may have some practical limitations in their use for making silicone hydrogel contact lenses according to Lightstream Technology™.

A commonly-owned U.S. patent application Ser. No. 12/456,364 now U.S. Pat. No. 8,163,206(herein incorporated by reference in its entirety) discloses a method for making silicone hydrogel contact lenses from a monomer mixture (i.e., a lens-forming composition) according to the Lightstream Technology™. However, it is discovered here that in addition to relatively longer curing time, relatively significant shrinkage during curing of the monomer mixture in molds can occur that may greatly impede the application of the Lightstream Technology™ in the manufacturing of silicone hydrogel contact lenses.

Therefore, there is still a need for new prepolymers suitable for making sislicone hydrogel contact lenses according to the Lightstream Technology™.

SUMMARY OF THE INVENTION

The invention provides an amphiphilic branched polysiloxane prepolymer suitable for making silicone hydrogel contact lenses according to the Lightstream Technology™. The polysiloxane prepolymer comprises hydrophilic monomeric units derived from at least one hydrophilic vinylic monomer, polysiloxane crosslinking units derived from at least one polysiloxane crosslinker having at least two terminal ethylenically-unsaturated groups, dangling polysiloxane chains each of which is terminated with one ethylenically unsaturated group, and chain-transfer units derived from a chain transfer agent other than a RAFT agent.

The invention also provides a method for making silicone hydrogel contact lenses. The method comprises the steps of: (i) obtaining an amphiphilic branched polysiloxane prepolymer of the invention (as described above), (ii) using the amphiphilic branched polysiloxane prepolymer to prepare a lens-forming composition which further comprises a free-radical initiator and optionally at least one polymerizable component selected from the group consisting of a hydrophilic vinylic monomer, a silicone-containing vinylic monomer or macromer, a hydrophobic vinylic monomer, a linear polysiloxane crosslinker terminated with two ethylenically-unsaturated groups, a crosslinking agent having a molecular weight of less than 700 Daltons, and mixtures thereof; (ii) introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming material is formed between said first and second molding surfaces; and (iii) polymerizing the lens-forming material in the cavity to form a silicone hydrogel contact lens.

The invention further provides a method for producing an amphiphilic, branched polysiloxane prepolymer of the invention.

The invention also further provides a silicone hydrogel contact lens comprising a polymeric material obtained from polymerization of a lens-forming composition comprising an amphiphilic branched polysiloxane prepolymer of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or macromer, a silicone-containing crosslinker, and/or at least one crosslinkable silicone-containing prepolymer.

A "vinylic monomer" refers to a low molecular weight compound that has one sole ethylenically-unsaturated group. Low molecular weight typically means average molecular weights less than 700 Daltons.

A "vinylic macromer" refers to a medium and high molecular weight compound which comprises one sole ethylenically unsaturated groups. Medium and high molecular weight typically means average molecular weights greater than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

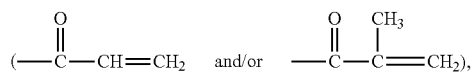

allyl, vinyl

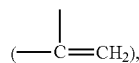

styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used herein, the term "amino group" refers to a functional group of —NHR' in which R' is hydrogen or a $C_1$-$C_{20}$ unsubstituted or substituted, linear or branched alkyl group.

As used herein, the term "azlactone group" refers to a functional group having the formula of

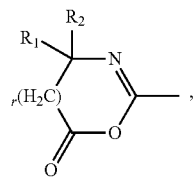

in which r is 0 or 1; $R_1$ and $R_2$ independently can be an alkyl group having 1 to 14 carbon atoms, a cycloalkyl group having 3 to 14 carbon atoms, an aryl group having 5 to 12 ring atoms, an arenyl group having 6 to 26 carbon and 0 to 3 sulfur, nitrogen and/or oxygen atoms, or $R_1$ and $R_2$ taken together with the carbon to which they are joined can form a carbocyclic ring containing 4 to 12 ring atoms.

As used herein "polysiloxane" refers to a compound or a segment including at least one divalent radical of

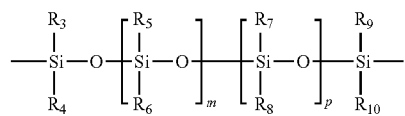

in which $R_3$, $R_4$, $R_5$, $R_6$, $R_7$, $R_8$, $R_9$, and $R_{10}$, independently of one another, are $C_1$-$C_{10}$ alkyl, $C_1$-$C_{10}$ aminoalkyl, $C_1$-$C_{10}$ hydroxyalkyl, $C_1$-$C_{10}$ ether, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, cyano($C_1$-$C_{12}$-alkyl), -alk-(OCH$_2$CH$_2$)$_n$—OR$_{11}$, in which alk is $C_1$-$C_6$ alkylene divalent radical, $R_{11}$ is hydrogen or $C_1$-$C_6$ alkyl, and n is an integer of from 1 to 10; m and p independently of each other are an integer of from 0 to 350 and (m+p) is from 1 to 700.

A "crosslinker" refers to a compound having at least two ethylenically-unsaturated groups.

A "crosslinking agent" refers to a compound with two or more ethylenically unsaturated groups and with molecular weight less than 700 Daltons. Crosslinking agents may be used to improve structural integrity and mechanical strength. The amount of a cross-linking agent used is expressed in the weight content with respect to the total polymer and is preferably in the range from about 0.05% to about 4%, and more preferably in the range from about 0.1% to about 2%. Examples of preferred cross-linking agents include without limitation tetraethyleneglycol di-(meth)acrylate, triethyleneglycol di-(meth)acrylate, ethyleneglycol di-(meth)acrylate, diethyleneglycol di-(meth)acrylate, trimethylopropane trimethacrylate, pentaerythritol tetramethacrylate, bisphenol A dimethacrylate, vinyl methacrylate, allyl(meth)acrylate, ethylenediamine di(meth)acrylamide, glycerol dimethacrylate, N,N'-methylenebis(meth)acrylamide, N,N'-ethylenebis (meth)acrylamide, N,N'-dihydroxyethylene bis(meth)acrylamide, triallyl isocyanurate, triallyl cyanurate, allyl(meth) acrylate, 1,3-bis(methacrylamidopropyl)-1,1,3,3-tetrakis (trimethylsiloxy)disiloxane, 1,3-bis (N-(meth)

acrylamidopropyl)-1,1,3,3-tetrakis-(trimethylsiloxy) disiloxane, 1,3-bis(methacrylamidobutyl)-1,1,3,3-tetrakis (trimethylsiloxy)-disiloxane, 1,3-bis (methacryloxyethylureidopropyl)-1,1,3,3-tetrakis (trimethylsiloxy)disiloxane, and combinations thereof. A more preferred cross-linking agent is a hydrophilic crosslinking agent, such as, tetra(ethyleneglycol) diacrylate, tri(ethyleneglycol) diacrylate, ethyleneglycol diacrylate, di(ethyleneglycol) diacrylate, glycerol dimethacrylate, N,N'-methylene bis(meth)acrylamide, N,N'-ethylene bis(meth) acrylamide, N,N'-dihydroxyethylene bis(meth)acrylamide, triallyl isocyanurate, triallyl cyanurate, or combination thereof.

The term "fluid" as used herein indicates that a material is capable of flowing like a liquid.

A "prepolymer" refers to a starting polymer which contains two or more ethylenically unsaturated groups and can be cured (e.g., crosslinked or polymerized) actinically to obtain a crosslinked polymer having a molecular weight much higher than the starting polymer.

A "silicone-containing prepolymer" refers to a prepolymer which contains silicone.

"Molecular weight" of a polymeric material (including monomeric or macromeric materials), as used herein, refers to the weight-average molecular weight unless otherwise specifically noted or unless testing conditions indicate otherwise.

"Polymer" means a material formed by polymerizing one or more monomers.

The term "RAFT" refers to radical addition-fragmentation transfer or reversible addition fragmentation chain transfer, as understood by a person skilled in the art.

A "RAFT agent" refers to a dithioester compound of

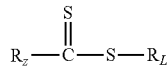

in which $R_L$ is a leaving group and has its traditional meanings as understood by one skilled in the art; $R_Z$ is an activating group and has its traditional meanings as understood by one skilled in the art.

As used herein, the term "ethylenically functionalized" in reference to a copolymer or a compound is intended to describe that one or more ethylenically groups have been covalently attached to a copolymer or compound through the pendant or terminal reactive functional groups of the copolymer or the compound according to a coupling process.

An "ethylenically functionalizing vinylic monomer" refers to a vinylic monomer having one reactive functional group capable of participating in a coupling (or crosslinking) reaction known to a person skilled in the art.

A "coupling reaction" is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof.

Non-limiting examples of coupling reactions under various reaction conditions between a pair of matching co-reactive functional groups selected from the group preferably consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, thiol group, and amide groups (—CONH$_2$), are given below for illustrative purposes. An amino group reacts with aldehyde group to form a Schiff base which may further be reduced; an amino group —NHR' reacts with an acid chloride or bromide group or with an acid anhydride group to form an amide linkage (—CO—NR'—); an amino group —NHR' reacts with an isocyanate group to form a urea linkage (—NR'—C(O)—NH—); an amino group —NHR' reacts with an epoxy or aziridine group to form an amine bond (C—NR'); an amino group reacts (ring-opening) with an azlactone group to form a linkage (—C(O)NH—CR$_1$R$_2$—(CH$_2$)$_r$—C(O)—NR'—); an amino group —NHR' reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form a linkage (—C(O)NH—CR$_1$R$_2$—(CH$_2$)$_r$—C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group group reacts with an azlactone group in the presence of a catalyst to form a linkage (—C(O) NH-alkylene-C(O)—S—); a thiol group reacts with a vinyl group based on thiol-ene reaction under thiol-ene reaction conditions to form a thioether linakge (—S—); and a thiol group reacts with an acryloyl or methacryloyl group based on Michael Addition under appropriate reaction conditions to form a thioether linkage.

It is also understood that coupling agents with two reactive functional groups may be used in the coupling reactions. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, two epoxy, two aziridine, two carboxyl, two acid halide, or two azlactone groups, or combinations thereof.

The reactions conditions for the above described coupling reactions are taught in textbooks and are well known to a person skilled in the art.

As used herein, the term "partially ethylenically-functionalized polysiloxane" means a mixture of products obtained as a result of an ethylenically functionalizing reaction between an ethylenically functionalizing vinylic monomer having one first reactive functional group and a functional polysiloxane compound having two or more second reactive functional groups at a molar equivalent ratio, $R_{Equivalent}$ (i.e., $$R_{Equivalent} \left( \text{i.e., } \frac{[\text{functionalizing vinylic monomer}]_{eq}}{[\text{linear polysiloxane compound}]_{eq}} \right)$$

of about 0.95 (or 95%) or less, wherein one first reactive functional group can react with one second reactive functional group in the presence or absence of a coupling agent according to a known coupling reaction as discussed later to form a covalent linkage. As used herein, the term "xx % ethylenically-functionalized polysiloxane" means a mixture of products obtained in which the ratio of the ethylenically functionalizing vinylic monomer and a functional polysiloxane compound at a molar equivalent ratio, $R_{Equivalent}$, of "xx %" (i.e., a value from about 40% to about 97%, preferably from about 50% to about 95%, more preferably from about 60% to about 92%, even more preferably from about 70% to about 90%).

As an illustrative example, if a functional polysiloxane compound to be ethylenically functionalized is a linear polysiloxane compound having two terminal reactive functional groups and the molar equivalent ratio $R_{Equivalent}$ of an ethylenically-functionalizing vinylic monomer to the polysiloxane compound is about 80%, then a 80% ethylenically-functionalized polysiloxane is a mixture of (a) a linear polysiloxane crosslinker having two terminal ethylenically unsaturated groups, (b) a polysiloxane vinylic monomer or macromer terminated with one ethylenically-unsaturated group and one second reactive functional group, and (c) unreacted linear polysiloxane compound terminated with two second reactive functional groups. The percentages of components (a)-(c) of the 80% ethylenically-functionalized polysiloxane (after substantial completion of reaction) can be estimated according to the following formula:

[Component (a)]% = $R_{Equivalent} \times R_{Equivalent}$ = 64%

[Component (b)]% = $2 \times R_{Equivalent} \times (1 - R_{Equivalent})$ = 32%

[Component (c)]% = $(1 - R_{Equivalent}) \times (1 - R_{Equivalent})$ = 4%

It should be understood that a polysiloxane compound to be ethylenically functionalized can be a star compound having "n" (e.g., 3 to 5) polyslioxane arms each terminated with one reactive functional group capable of participating a coupling reaction. The number of ethylenically-functionalizing reaction products in the resultant mixture would be (n+1) and their percentages are respectively, $(R_{Equivalent})^n$, $(R_{Equivalent})^{n-1} \times (1 - R_{Equivalent}) \times n$, $(R_{Equivalent})^{n-2} \times (1 - R_{Equivalent})^2 \times n$, ..., $(R_{Equivalent}) \times (1 - R_{Equivalent})^{n-1} \times n$, $(1 - R_{Equivalent})^n$.

As used herein, the term "multiple" refers to two or more.

A free radical initiator can be either a photoinitiator or a thermal initiator. A "photoinitiator" refers to a chemical that initiates free radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types of photoinitiators, and Irgacure® types of photoinitiators, preferably Darocure® 1173, and Irgacure® 2959. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "polymerizable UV-absorbing agent" refers to a compound comprising an ethylenically-unsaturated group and a UV-absorbing moiety or a latent UV-absorbing moiety.

A "UV-absorbing moiety" refers to an organic functional group which can absorb or screen out UV radiation in the range from 200 nm to 400 nm as understood by a person skilled in the art.

A "polymerizable latent UV-absorbing agent" refers to a compound comprising an ethylencially unsaturated group and a UV-absorbing moiety which has been protected by a labile function group so that its absorption coefficients of UV radiation in the wavelength region from 200 nm to 400 nm are about 50% or less, preferably 70% or less, more preferably about 90% or less of those of the UV-absorbing moiety without the protected labile function group.

The term "labile functional group" means a protective functional group which can be removed (cleaved) from another functional group being protected by the labile functional group.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

The term "dangling polysiloxane chains" in reference to an amphiphilic branched polysiloxane copolymer or prepolymer is intended to describe that the copolymer or prepolymer comprises linear polysiloxane chains each of which comprises one or more polysiloxane segments and is anchored to the main chain of the copolymer or prepolymer through one single covalent linkage at one of the two ends of the polysiloxane chain.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and a hydrophilic coating composed of covalent attachment or physical deposition of one or more layers of one or more hydrophilic polymer onto the surface of a contact lens.

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (angle measured by Sessile Drop), which is obtained by averaging measurements of at least 3 individual contact lenses.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which are made essentially of silver metal and have a size of less than 1 micrometer.

The intrinsic "oxygen permeability", $Dk$, of a material is the rate at which oxygen will pass through a material. In accordance with the invention, the term "oxygen permeability ($Dk$)" in reference to a contact lens means an apparent oxygen permeability which is measured with a sample (film or lens) having an average thickness over the area being measured according to a known method. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", $Dk/t$, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

The "ion permeability" through a lens correlates with the Ionoflux Diffusion Coefficient. The Ionoflux Diffusion Coefficient, D (in units of $[mm^2/min]$), is determined by applying Fick's law as follows:

$$D = -n'/(A \times dc/dx)$$

where n'=rate of ion transport [mol/min]; A=area of lens exposed [$mm^2$]; dc=concentration difference [mol/L]; dx=thickness of lens [mm].

In general, the invention is directed to a class of amphiphilic branched polysiloxane prepolymer of the invention, a method for making an amphiphilic branched polysiloxane prepolymer of the invention, a method for making silicone hydrogel contact lenses from a prepolymer of the invention, and silicone hydrogel contact lenses prepared from a prepolymer of the invention.

In the first aspect, the invention provides an amphiphilic branched polysiloxane prepolymer suitable for making silicone hydrogel contact lenses according to the Lightstream Technology™. The polysiloxane prepolymer of the invention comprises (1) from about 5% to about 75%, preferably from about 10% to about 65%, more preferably from about 15% to about 55%, even more preferably from about 20% to about 45%, by weight of hydrophilic monomeric units derived from at least one hydrophilic vinylic monomer, (2) from about 1% to about 85%, preferably from about 2.5% to about 75%, more preferably from about 5% to about 65%, by weight of polysiloxane crosslinking units derived from at least one polysiloxane crosslinker having two or more terminal ethylenically-unsaturated groups, (3) from about 2% to about 48%, preferably from about 3% to about 38%, more preferably from about 4% to about 28%, by weight of dangling polysiloxane chains each of which is terminated with an ethylenically unsaturated group, and (4) from about 0.25% to about 5%, preferably from about 0.5% to about 4%, more preferably from about 0.75% to about 3%, even more preferably from about 1% to about 2%, by weight of chain-transfer units derived from a chain transfer agent other than a RAFT agent.

In accordance with the invention, an amphiphilic branched polysiloxane prepolymer is soluble in a solvent or a mixture of two or more solvents at room temperature so that a lens-forming composition containing from about 5% to about 90% by weight of the amphiphilic branched polysiloxane prepolymer can be obtained.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

An amphiphilic branched polysiloxane prepolymer of the invention is obtained by: (i) polymerizing a polymerizable composition to obtain an amphiphilic branched polysiloxane copolymer, wherein the polymerizable composition comprises (a) a partially ethylenically-functionalized polysiloxane, wherein the partially ethylenically-functionalized polysiloxane is a mixture of reaction products obtained by reacting a first ethyleincally functionalizing vinylic monomer having a first reactive functional group with a functional polysiloxane compound having two or more second reactive functional groups at a molar equivalent ratio, $R_{Equivalent}$, of from about 40% to about 95%, preferably from about 50% to about 95%, more preferably from about 60% to about 92%, even more preferably from about 70% to about 90% (the ethylenically functionalizing vinylic monomer to the functional polysiloxane compound), wherein each first reactive functional group reacts with one second reactive functional group in the presence or absence of a coupling agent to form a covalent bond or linkage, wherein the mixture of reaction product comprises at least one polysiloxane crosslinkers having at least two ethylenically unsaturated groups and at least one polysiloxane vinylic monomer or macromer having at least one second reactive functional group and at least one ethylenically unsaturated group; (b) at least one hydrophilic vinylic monomer; (c) optionally, but preferably, a hydrophobic vinylic monomer, more preferably, a bulky hydrophobic vinylic monomer (i.e., one having a bulky substitute group; (d) a chain transfer agent other than a RAFT agent, wherein the chain transfer agent optionally but preferably including a third reactive functional group; and (e) a free-radical initiator (a photoinitiator or thermal initiator, preferably a thermal initiator); and (ii) ethylenically functionalizing the amphiphilic branched polysiloxane copolymer by reacting it with a second ethylenically functionalizing vinylic monomer having a fourth reactive functional group which reacts with one second or third reactive functional group in the presence or absence of a coupling agent to form a covalent linkage, thereby forming the amphiphilic branched polysiloxane prepolymer.

Preferably, the functional polysiloxane compound in the polymerizable composition is defined by formula (1) or (2)

in which $G_1$ and $G_2$ independent of each other is a direct bond, a linear or branched $C_1$-$C_{10}$ alkylene divalent radical, a divalent radical of

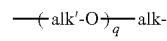

in which q is an integer of from 1 to 5 and alk and alk' independent of each other are a $C_1$-$C_6$ alkylene divalent radical, or a divalent radical of —$R_1'$—$X_1$-E-$X_2$—$R_2'$— in which $R_1'$ and $R_2'$ independent of each other is a direct bond, a linear or branched $C_1$-$C_{10}$ alkylene divalent radical, or a divalent radical of

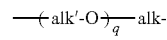

as defined above, $X_1$ and $X_2$ independent of each other are a linkage selected from the group consisting of

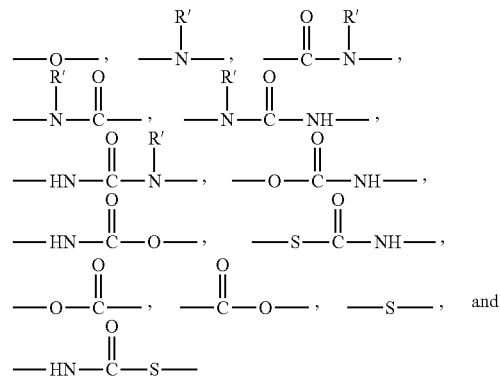

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms which may have ether, thio, or amine linkages in the main chain;

PDMS is a polysiloxane divalent radical of formula (3)

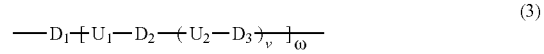

in which v is 0 or 1, ω is an integer of from 0 to 5, $U_1$ and $U_2$ independent of each other represent a divalent radical of —R', —X$_1$-E—X$_2$—R$_2$'— as defined above or a divalent radical of

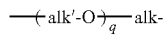

as defined above, D$_1$, D$_2$ and D$_3$ independently of each other are a divalent radical selected from the group consisting of —(CH$_2$CH$_2$O)$_t$—CH$_2$CH$_2$— in which t is an integer of 3 to 40, —CF$_2$—(OCF$_2$)$_a$—(OCF$_2$CF$_2$)$_b$—OCF$_2$— in which a and b independent of each other is an integer of 0 to 10 provided that a+b is a number in the range of 10 to 30, and a divalent group of formula (4)

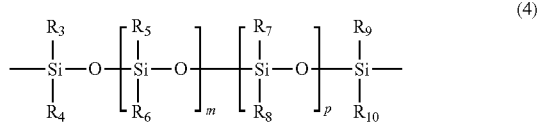

in which R$_3$, R$_4$, R$_5$, R$_6$, R$_7$, R$_8$, R$_9$, and R$_{10}$, independently of one another, are C$_1$-C$_{10}$ alkyl, C$_1$-C$_{10}$ aminoalkyl, C$_1$-C$_{10}$ hydroxyalkyl, C$_1$-C$_{10}$ ether, C$_1$-C$_4$ alkyl- or C$_1$-C$_4$-alkoxy-substituted phenyl, C$_1$-C$_{10}$ fluoroalkyl, C$_1$-C$_{10}$ fluoroether, C$_6$-C$_{18}$ aryl radical, cyano(C$_1$-C$_{12}$-alkyl), -alk-(OCH$_2$CH$_2$)$_n$—OR$_{11}$, in which alk is C$_1$-C$_6$ alkylene divalent radical, R$_{11}$ is hydrogen or C$_1$-C$_6$ alkyl, and n is an integer of from 1 to 10; m and p independently of each other are an integer of from 0 to 350 and (m+p) is from 1 to 700, provided that at least one of D$_1$, D$_2$ and D$_3$ is represented by formula (3);

CR is a multivalent organic radical having a valence of a1; a1 is an integer of 3, 4 or 5; and FG is selected from the group consisting of amino group (—NHR as defined above), hydroxyl group, carboxylic acid group, acid halide groups (—COX, X═Cl, Br, or I), acid anhydrate group, aldehyde group, azlactone group, isocyanate group, epoxy group, aziridine group, thiol (—SH), and amide groups (—CONH$_2$).

Preferably, in formula (1) or (2), PDMS is a polysiloxane divalent radical of formula (3) in which: v is 0 or 1, preferably 1, ω is an integer of from 0 to 3, preferably 1, U$_1$ and U$_2$ are as defined above, D$_1$, D$_2$ and D$_3$ independently of each other are a divalent radical of formula (4) in which R$_3$ to R$_{10}$ independent of one another are methyl groups, fluoro(C$_1$-C$_{18}$-alkyl), and/or -alk-(OCH$_2$CH$_2$)$_n$—OR$_{11}$ in which alk is C$_1$-C$_6$-alkylene divalent radical and R$_{11}$ is C$_1$-C$_6$ alkyl, and n is an integer from 1 to 10, m and p independently of each other are an integer of from 1 to 698 and (m+p) is from 2 to 700.

Various difunctional group (reactive) terminated polysiloxanes (i.e., having one sole polysiloxane segment of formula (4)) can be obtained from commercial suppliers (e.g., from Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety).

Where a functional polysiloxane compound of formula (1) is a functional chain-extended polysiloxane compound, namely having two to five polysiloxane segments of formula (4), such functional chain-extended polysiloxane compound can be prepared by reacting a difunctional group (reactive)-terminated polysiloxane compound having one sole polysiloxane segment of formula (4) and two third reactive functional groups with a coupling agent having two fourth reactive functional groups, wherein the third and fourth reactive functional groups are different from each other but reactive with each other and are selected from the group consisting of amino group (—NHR as defined above), hydroxyl group, thiol group, carboxylic acid group, acid halide groups (—COX, X═Cl, Br, or I), acid anhydrate group, aldehyde group, azlactone group, isocyanate group, epoxy group, aziridine group, thiol (—SH), and amide groups (—CONH$_2$). A coupling agent having two fourth reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a functional chain-extended polysiloxane compound.

Any suitable C$_4$-C$_{24}$ diisocyanates can be used in the invention. Examples of preferred diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

Any suitable diamines can be used in the invention. An organic diamine can be a linear or branched C$_2$-C$_{24}$ aliphatic diamine, a C$_5$-C$_{24}$ cycloaliphatic or aliphatic-cycloaliphatic diamine, or a C$_6$-C$_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, and isophorone diamine.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, and dimer acid chloride.

Any suitable di-epoxy compounds can be used in the invention. Examples of preferred di-epoxy compounds are neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, and dipropylene glycol diglycidyl ether. Such di-epoxy compounds are available commercially (e.g., those DENACOL series di-epoxy compounds from Nagase ChemteX Corporation).

Any suitable C$_2$-C$_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, and various cyclohexanediols.

Any suitable C$_3$-C$_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or araliphatic dicarboxylic acid, or a dicarboxylic acid which contains amino or imido groups or N-heterocyclic rings. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxyphenyl)-methane.

Any suitable $C_{10}$-$C_{24}$ di-azlactone compounds can be used in the invention. Examples of such diazlactone compounds are those described in U.S. Pat. No. 4,485,236 (herein incorporated by reference in its entirety).

Any suitable dithiols can be used in the invention. Examples of such dithiols include without limitations $C_2$-$C_{12}$ alkyl dimercaptans (e.g., ethyl dimercaptan, propyl dimercaptan, butyl dimercaptan, pentamethylen dimercaptan, hexamethylene dimercaptan, heptamethylene dimercaptan, octamethylen dimercaptan, nonamethylene dimercaptan, decamethylene dimercaptan, or combinations thereof), ethylcyclohexyl dimercaptan, dipentene dimercaptan, benzenedithiol, methyl-substituted benzenedithiol, benzenedimethanethiol, glycol dimercaptoacetate, ethyl ether dimercaptan (diglycol dimercaptan), triglycol dimercaptan, tetraglycol dimercaptan, dimercaprol, dimercaptopropanol, dimercaptobutanol, dimercaptopentanol, dimercaptopropionic acid, dihydrolipoic acid, dithiothreitol, dimercaptosuccinic acid, and combinations thereof.

In formula (2), CR is the core of the functional multi-arm star polysiloxane and is derived from a branching agent, namely a compounds having 3 to 5, preferably 3, fifth reactive functional groups which can participate in any known coupling reaction and are selected from the group consisting of amine groups, hydroxyl groups, carboxylic groups, isocyanate groups, thiol groups, (meth)acryloyl groups, vinyl groups (i.e., in which each carbon-carbon double bond is not directly connected to a carbonyl group or to oxygen or nitrogen atom), acid halide groups, epoxy groups, and combinations thereof. Examples of preferred branching agents include without limitation glycerol, diglycerol, triglycerol, arabitol, 1,1,1-trishydroxymethylethane, 1,1,1-trishydroxymethylpropane, 1,2,4-butanetriol, 1,2,6-hexanetriol, erythritol, pentaerythritol, diethylenetriamine, N-2'-aminoethyl-1,3-propylenediamine, N,N-bis(3-aminopropyl)-amine, N,N-bis(6-aminohexyl)amine, triethylenetetramine, the isocyanurate trimer of hexamethylene diisocyanate, 2,4,6-toluene triisocyanate, p, p', p"-triphenylmethane triisocyanate, and the trifunctional trimer (isocyanurate) of isophorone diisocyanate, trimesoyl chloride, cyclohexane-1,3,5-tricarbonyl chloride, trimer acid chloride, triglycidylisocyanurate (TGIC), trimethylopropane trimethacrylate, pentaerythritol tetramethacrylate, triallyl isocyanurate, triallyl cyanurate, aconitic acid, citric acid, 1,3,5-cyclohexanetricarboxylic acid, 1,3,5-trimethyl-1,3,5-cyclohexanetricarboxylic acid, 1,2,3 benzene tricarboxylic acid, 1,2,4 benzene tricarboxylic acid, 1,3,5-pentanetrithiol.

A person skilled in the art knows well how to prepare a functional multi-arm star polysiloxane of formula (2) according to any known coupling reactions. For example, a polysiloxane of formula (2) can be prepared as follows, A branching agent is reacted with an excess molar equivalent amount of a di-functionalized polydisiloxane to form a functional multi-arm star polydisiloxane with three or four arms each having a terminal reactive functional group for further reactions, according to any known coupling reactions including those described above. If each arm comprises more than one polysiloxane segments, a functional chain-extended polysiloxane prepared above can be used to react with a branching agent.

In accordance with the invention, any suitable ethylenically-functionalizing vinylic monomers can be used in the invention for preparing partially ethylenically-functionalized polysiloxanes and/or for preparing an amphiphilic branched polysiloxane prepolymer of the invention. It is understood that the second ethylenically-functionalizing vinylic monomer can be different from but preferably identical to the first ethylenically functionalizing vinylic monomer (used in preparing the partially ethylenically functionalized polysiloxane). Examples of ethylenically-functionalizing vinylic monomers include without limitation $C_2$ to $C_6$ hydroxylalkyl (meth)acrylate, $C_2$ to $C_6$ hydroxyalkyl(meth)acrylamide, allylalcohol, allylamine, amino-$C_2$-$C_6$ alkyl(meth)acrylate, $C_1$-$C_6$ alkylamino-$C_2$-$C_6$ alkyl(meth)acrylate, vinylamine, amino-$C_2$-$C_6$ alkyl(meth)acrylamide, $C_1$-$C_6$ alkylamino-$C_2$-$C_6$ alkyl(meth)acrylamide, acrylic acid, $C_1$-$C_4$ alkylacrylic acid (e.g., methacrylic ethylacrylic acid, propylacrylic acid, butylacrylic acid), N-[tris(hydroxymethyl)-methyl]acrylamide, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, aziridinyl $C_1$-$C_{12}$ alkyl(meth)acrylate (e.g., 2-(1-aziridinyl)ethyl(meth)acrylate, 3-(1-aziridinyl) propyl(meth)acrylate, 4-(1-aziridinyl) butyl(meth)acrylate, 6-(1-aziridinyl) hexyl(meth)acrylate, or 8-(1-aziridinyl) octyl (meth)acrylate), glycidyl(meth)acrylate, vinyl glycidyl ether, allyl glycidyl ether, (meth)acrylic acid halide groups (—COX, X=Cl, Br, or I), $C_1$ to $C_6$ isocyanatoalkyl(meth) acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), and combinations thereof.

Preferably, the first reactive functional group of the first ethylenically functionalizing vinylic monomer, the fourth reactive functional group of the second ethylenically functionalizing vinylic monomer, the second reactive functional groups of the functional polysiloxane compound, and the third reactive functional group of the chain transfer agent, independently of each other, are selected from the group consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, amide groups (—CONH$_2$), and combinations thereof, more preferably selected from the group consisting of amino group (—NHR' as defined above), hydroxyl group, carboxylic acid group, acid halide groups (—COX, X=Cl, Br, or I), azlactone group, isocyanate group, epoxy group, aziridine group, and combinations thereof, provided that one first or fourth reactive functional group can react with one second or third reactive functional group in the presence or absence of a coupling agent to form a covalent linkage.

It is understood that a partially ethylenically functionalized polysiloxane comprises at least one polysiloxane vinylic monomer or macromer having at least one ethylenically unsaturated groups and at least one reactive functional group. Such polysiloxane vinylic monomer or macromer having at least one reactive functional group gives rise to formation of dangling polysiloxane chains each terminated with one reactive functional group in an amphiphilic branched polysiloxane copolymer and eventually to the formation of dangling polysiloxane chains each terminated with one ethylenically unsaturated group in an amphiphilic branched polysiloxane prepolymer of the invention. Where a polysiloxane vinylic monomer or macromer has two or more ethylenically unsaturated groups and at least one reactive functional group, it can serve also a polysiloxane crosslinker.

Preferably, a functional polysiloxane used for preparing a partially ethylenically functionalized polysiloxane is represented by formula (1). More preferably, an ethylenically functionalizing vinylic monomer is reacted with a functional polysiloxane compound of formula (1) at a molar equivalent of from 70% to about 90% to obtain a partially ethylenically functionalized polysiloxane.

In accordance with this aspect of the invention, any suitable hydrophilic vinylic monomers can be used in the preparation of an amphiphilic branched polysiloxane prepolymer of the invention. Suitable hydrophilic vinylic monomers are, without this being an exhaustive list, hydroxyl-substituted $C_1$-$C_6$ alkyl(meth)acrylates, hydroxyl-substituted $C_1$-$C_6$ alkyl (meth)acrylamides, hydroxyl-substituted $C_1$-$C_6$ alkyl vinyl ethers, $C_1$ to $C_6$ alkyl (meth)acrylamide, di-($C_1$-$C_6$ alkyl) (meth)acrylamide, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino-substituted $C_1$-$C_6$ alkyl- (where the term "amino" also includes quaternary ammonium), mono($C_1$-$C_6$ alkyl amino)($C_1$-$C_6$ alkyl) and di($C_1$-$C_6$ alkyl amino)($C_1$-$C_6$ alkyl) (meth)acrylates or (meth)acrylamides, allyl alcohol, vinylamine, N-vinyl $C_1$-$C_6$ alkylamide, N-vinyl-N—$C_1$-$C_6$ alkyl amide, and combinations thereof.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N4-tris(hydroxymethyl)methylFacrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof. Among those preferred hydrophilic vinylic monomers, those free of any reactive functional group are particularly preferred for incorporating in the polymerizable composition for preparing the amphiphilic branched polysiloxane copolymer.

In accordance with this aspect of the invention, any suitable hydrophobic vinylic monomers can be used in the preparation of an amphiphilic branched polysiloxane prepolymer of the invention. Examples of preferred hydrophobic vinylic monomers include methyl (meth)acrylate, ethyl(meth)acrylate, propyl(meth)acrylate, isopropyl(meth)acrylate, butyl (meth) acrylate, sec-butyl(meth)acrylate, isobutyl(meth)acrylate, t-butyl(meth)acrylate, cyclohexylacrylate, 2-ethylhexylacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl -thio-carbonyl-aminoethyl-methacrylate, isobornyl methacrylate, trifluoroethyl methacrylate, hexafluoro-isopropyl methacrylate, hexafluorobutyl methacrylate, a silicone-containing vinylic monomer, and mixtures thereof. Most preferably, the polymerizable composition comprises a bulky hydrophobic vinylic monomer. Preferred bulky hydrophobic vinylic monomers include without limitation N-[tris(trimethylsiloxy)silylpropyl]-(meth)acrylamide; N-[tris(dimethylpropylsiloxy)-silylpropyl] (meth)acrylamide; N-[tris(dimethylphenylsiloxy)-silylpropyl](meth)acrylamide; N-[tris (dimethylethylsiloxy)silylpropyl] (meth)acrylamide; N-(2-hydroxy-3-(3-(bis(trimethylsilyloxy)methylsilyl)propyloxy) propyl)-2-methyl acrylamide; N-(2-hydroxy-3-(3-(bis (trimethylsilyloxy)methylsilyl)propyloxy)propyl) acrylamide; N,N-bis[2-hydroxy-3-(3-(bis(trimethylsilyloxy) methylsilyl)propyloxy)propyl]-2-methyl acrylamide; N,N-bis[2-hydroxy-3-(3-(bis(trimethylsilyloxy)methylsilyl) propyloxy)propyl]acrylamide; N-(2-hydroxy-3-(3-(tris (trimethylsilyloxy)silyl)propyloxy)propyl)-2-methyl acrylamide; N-(2-hydroxy-3-(3-(tris(trimethylsilyloxy)silyl) propyloxy)propyl)acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsilyloxy)silyl) propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl) propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane; tris(trimethylsilyloxy)silylpropyl methacrylate (TRIS); (3-methacryloxy-2-hydroxypropyloxy)propylbis(trimethylsiloxy)methylsilane); (3-methacryloxy-2-hydroxypropyloxy)propyltris(trimethylsiloxy)silane; 3-methacryloxy-2-(2-hydroxyethoxy)-propyloxy)propylbis(trimethylsiloxy) methylsilane; N-2-methacryloxyethyl-O-(methyl-bis-trimethylsiloxy-3-propyl)silyl carbamate; 3-(trimethylsilyl) propylvinyl carbonate; 3-(vinyloxycarbonylthio)propyl-tris (trimethyl-siloxy)silane; 3-[tris(trimethylsiloxy)silyl] propylvinyl carbamate; 3-[tris(trimethylsiloxy)silyl]propyl allyl carbamate; 3-[tris(trimethylsiloxy)silyl]propyl vinyl carbonate; t-butyldimethyl-siloxyethyl vinyl carbonate; trimethylsilylethyl vinyl carbonate; trimethylsilylmethyl vinyl carbonate; t-butyl(meth)acrylate, cyclohexylacrylate, isobornyl methacrylate, a polysiloxane-containing vinylic monomer (having 3 to 8 silicone atoms), and combinations thereof.

It is believed that the presence of such bulky hydrophobic vinylic monomer in the polysiloxane prepolymer may be able to minimize or eliminate optical defects (permanent deformations) derived from handling during manufacturing in lenses made from a lens-forming composition comprising the polysiloxane prepolymer. Such deformation or optical defect refers to permanent folding marks observed on the lens by a Contact Lens Optical Quality Analyzer (CLOQA) after the lens is folded manually as described in Example 1 of copending U.S. patent application Ser. No. 12/456,364 (herein incorporated by reference in its entirety). It is believed that when a bulky hydrophobic vinylic monomer is present, resultant lenses exhibit a 'healing' effect that eliminated the optical defects (i.e., the folding marks become transient and can disappear after a short time period, e.g., about 15 minutes or less).

In accordance with the invention, a chain transfer agent may comprise one or more thiol groups, for example two or most preferably one thiol group. Where a chain transfer agent comprises a reactive functional group (e.g., hydroxyl, amino, or carboxylic acid group) in addition to thiol group, such chain transfer agent can be used to provide functionality for subsequent addition of an ethylenically unsaturated group. Suitable chain transfer agents include organic primary thiols or mercaptans having a further reactive functional group such as, for example, hydroxy, amino, N—$C_1$-$C_6$-alkylamino, carboxy or a suitable derivative thereof. A preferred chain transfer agent is a cycloaliphatic or preferably aliphatic thiol having from 2 to about 24 carbon atoms and having a further reactive functional group selected from amino, hydroxy and carboxy; accordingly, the preferred chain transfer agents are aliphatic mercapto carboxylic acids, hydroxymercaptans or aminomercaptans. Examples of preferred chain transfer agents are 2-mercaptoethanol, 2-aminoethane thiol (cysteamine), 2-mercaptopropinic acid, thioglycolic acid, thiolactic acid, ethanedithiol, propanedithiol, and combinations thereof. In case of an amine or a carboxylic acid, the chain transfer agent may be in form of the free amine or acid or, preferably, in form of a suitable salt thereof, for example a hydrochloride in case of an amine or a sodium, potassium or amine salt in case of an acid.

In a preferred embodiment, the polymerizable composition comprises a first hydrophilic vinylic monomer free of any reactive functional group capable of participating in a coupling reaction with the second ethylenically functionalizing vinylic monomer and a second hydrophilic vinylic monomer having a reactive functional group capable of participating the coupling reaction with the second ethylenically functionalizing vinylic monomer, wherein the first and second hydrophilic vinylic monomers are present in the polymerizable composition at a ratio of from about 5:1 to about 30:1. The first hydrophilic vinylic monomer is preferably selected from the group consisting of N,N-dimethyl(meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, dimethylaminoethyl(meth)acrylate, N-vinyl-2-pyrrolidone, a $C_1$-$C_4$-alkoxy polyethylene glycol (meth)acrylate, N-vinyl formamide, N-vinyl acetamide, N-vinyl isopropylamide, N-vinyl-N-methyl acetamide, and mixtures thereof; and the second hydrophilic vinylic monomer is preferably selected from the group consisting of hydroxyl-substituted $C_1$-$C_4$ alkyl(meth)acrylate, hydroxyl-substituted $C_1$-$C_4$ alkyl (meth)acrylamide, amino-substituted $C_1$-$C_4$ alkyl(meth) acrylate, amino-substituted $C_1$-$C_4$ alkyl(meth)acrylamide, allyl alcohol, allyl amine, and mixture thereof.

In another preferred embodiment, an amphiphilic branched polysiloxane copolymer for making an amphiphilic branched polysiloxane prepolymer of the invention is obtained by polymerizing a polymerizable composition comprising: (a) from about 10% to about 94%, preferably from about 20% to about 80%, more preferably from about 40% to about 65%, by weight of a partially (40% to about 95%, preferably from about 50% to about 95%, more preferably from about 60% to about 92%, even more preferably from about 70% to about 90%) ethylenically-functionalized polysiloxane (i.e., a partially-ethylenically-functionalized polysiloxane); (b) from about 5% to about 75%, preferably from about 10% to about 65%, more preferably from about 15% to about 55%, even more preferably from about 20% to about 45%, by weight of at least one hydrophilic vinylic monomer; (c) from 0 to about 55%, preferably from about 5% to about 45%, more preferably from about 10% to about 40%, even more preferably from about 15% to about 30%, by weight of a bulky hydrophobic vinylic monomer; (d) from about 0.25% to about 5%, preferably from about 0.5% to about 4%, more preferably from about 0.75% to about 3%, even more preferably from about 1% to about 2%, by weight of a chain transfer agent other than a RAFT agent, wherein the chain transfer agent optionally but preferably including a reactive functional group; (e) from 0 to 5% by weight, preferably from about 0.2% to 4% by weight, more preferably from about 0.3% to about 2.5% by weight, even more preferably from about 0.5% to about 1.8%, by weight of a polymerizable UV-absorbing compound; and (f) from about 0.1% to about 5%, preferably from about 0.2% to about 4%, more preferably from about 0.3% to about 3%, even more preferably from about 0.4% to about 1.5%, by weight of a free-radical initiator (a photoinitiator or a thermal initiator, preferably a thermal initiator). Percentages by weight of the above-listed components are relative to the combined weight of all polymerizable components (which can include additional polymerizable components not listed here).

Preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone. A polymerizable UV-absorbing agent is generally is present in the polymerizable composition for preparing a polysiloxane copolymer which is ethylenically functionalized in turn to obtain a polysiloxane prepolymer of the invention in an amount sufficient to render a contact lens, which is made from a lens forming material including the prepolymer and which absorbs at least about 80 percent of the UV light in the range of from about 280 nm to about 370 nm that impinges on the lens. A person skilled in the art will understand that the specific amount of UV-absorbing agent used in the polymerizable composition will depend on the molecular weight of the UV-absorbing agent and its extinction coefficient in the range from about 280 to about 370 nm. In accordance with the invention, the polymerizable composition comprises about 0.2% to about 5.0%, preferably about 0.3% to about 2.5%, more preferably about 0.5% to about 1.8%, by weight of a UV-absorbing agent.

The polymerizable composition for preparing an amphiphilic branched polysiloxane copolymer can further comprise a polysiloxane-containing vinylic macromer. A polysiloxane-containing vinylic macromer can be prepared according to any known procedures, for example, those described in U.S. Pat. Nos. 4,136,250, 4,486,577, 4,605,712, 5,034,461, 5,416,132, and 5,760,100, herein incorporated by reference in their entireties.

Examples of preferred polysiloxane-containing vinylic monomers or macromers include without limitation mono-(meth)acrylate-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); mono-vinyl-terminated, mono-vinyl carbonate-terminated or mono-vinyl carbamate-terminated polydimethylsiloxanes of various molecular weight; polysiloxanylalkyl(meth)acrylic monomers; hydroxyl-functionalized siloxane-containing vinylic monomers or macromers; and mixtures thereof. Examples of preferred polysiloxane-containing crosslinkers include without limitation di-(meth)acrylated polydimethylsiloxanes (or so called polysiloxane crosslinkers) of various molecular weight; di-vinyl carbonate-terminated polydimethylsiloxanes (polysiloxane crosslinkers); di-vinyl carbamate-terminated polydimethylsiloxane (polysiloxane crosslinkers); di-vinyl terminated polydimethylsiloxanes (polysiloxane crosslinkers); di-(meth)acrylamide-terminated polydimethylsiloxanes (polysiloxane crosslinkers); bis-3-methacryloxy-2-hydroxypropyloxypropyl polydimethylsiloxane (polysiloxane crosslinker); N,N,N',N'-tetrakis(3-methacryloxy-2-hydroxypropyl)-alpha, omega-bis-3-aminopropyl-polydimethylsiloxane (polysiloxane crosslinkers); siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; polysiloxane-containing crosslinkers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing crosslinkers disclosed in U.S. Pat. Nos. 4,259,467, 4,260,725, and 4,261,875 (herein incorporated by reference in their entireties); di- and tri-block crosslinkers consisting of polydimethylsiloxane and polyalkyleneoxides (e.g., methacrylate end capped polyethyleneoxide-block-polydimethylsiloxane-block-polyethyleneoxide); and mixtures thereof.

A further class of preferred polysiloxane-containing crosslinkers is silicon-containing prepolymers comprising hydrophilic segments and hydrohphobic segments. Any suitable of silicone-containing prepolymers with hydrophilic segments and hydrohphobic segments can be used in the invention. Examples of such silicone-containing prepolymers include those described in commonly-owned U.S. Pat. Nos. 6,039,913, 6,043,328, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Ser. Nos. 12/313,546, 12/616,166 and 12/616,169; all of which are incorporated herein by references in their entireties.

Polymerization of a polymerizable composition for preparing an amphiphilic branched polysiloxane copolymer is based on well-known radical chain growth polymerization and can be performed according to any known methods and in any containers (reactors) suitable for polymerization. The polymerization is preferably initiated thermally. A polymerizable composition for preparing an amphiphilic branched polysiloxane can be prepared by dissolving all of components in any suitable solvent known to a person skilled in the art.

The obtained amphiphilic branched polysiloxane copolymer then is ethylenically functionalized by reacting it with a second ethyenically-functionalizing vinylic monomer having a fourth reactive functional group to obtain an amphiphilic branched polysiloxane prepolymer of the invention, provided that the fourth reactive group can react with one of the terminal second reactive functional groups and the third functional groups (if available) of the amphiphilic branched polysiloxane copolymer, in the presence or absence of a coupling agent, to form a covalent linkage. It is understood that, during this step of ethylenical functionalization, the unreacted functional polysiloxane, which is inherently presented in the partially ethylenically functionalized polysiloxane, is also ethylenically functionalized to form a polysiloxane crosslinker that can be used together with the resultant amphiphilic branched polysiloxane prepolymer in preparing a lens formulation for making silicone hydrogel contact lenses.

In accordance with the invention, the molar equivalent ratio of the second ethylenically functionalizing vinylic monomer to the amphiphilic polysiloxane copolymer is greater than 1, preferably from about 1 to about 1.2, more preferably from about 1 to about 1.1, even more preferably from about 1 to 1.05. It is understand that the calculation of the molar equivalent ratio should account all of possible reactive functional groups of the amphiphilic branched copolymer, including those derived from the partially ethylenically functionalized polysiloxane, from the chain transfer agent, from any other polymerizable components having a reactive functional group in the polymerizable composition. Such calculation can be done based on starting materials for preparing the amphiphilic branched polysiloxane copolymer. The excess amount of the second ethylenically functionalizing vinylic monomer can be (but preferably not be) removed from the resultant amphiphilic branched polysiloxane prepolymer before the prepolymer is used in preparing a lens formulation for making silicone hydrogel contact lenses.

In accordance with the invention, the weight percentages of the components of an amphiphilic branched polysiloxane prepolymer is determined by the polymerizable composition or mixture based on the total weight of all the polymerizable components of the composition or mixture used for preparing an amphiphilic branched polysiloxane copolymer which in turn is ethylenically functionalized to form the prepolymer of the invention. For example, if a polymerizable mixture, for preparing an amphiphilic branched polysiloxane copolymer which is in turn ethylenically functionalized to form the prepolymer of the invention, comprises about 44% by weight of a 80%-ethylenically functionalized linear polydimethylsiloxane (which contains 64% of a linear polysiloxane crosslinker with two ethylenically unsaturated groups, 32% of a linear polysiloxane with one ethylenically-unsaturated group and one reactive functional group for ethylenical functionalization, 4% of a linear polysiloxane with two terminal reactive functional groups which is not incorporated into the amphiphilic branched prepolymer, the percentaged are calculated as described above), about 28.5% by weight of at least one hydrophilic vinylic monomer, about 26% by weight of a bulky hydrophobic vinylic monomer (e.g., TRIS or the like), and about 1.5% of a chain transfer agent (e.g., mercaptoethanol), then the resultant amphiphilic branched prepolymer comprise about 28% by weight of polysiloxane crosslinking units (44%×64%×100), about 14% by weight of dangling polysiloxane chains each of which is terminated with an ethylenically unsaturated group (44%×32%×100), about 28.5% by weight of hydrophilic monomeric units, about 26% by weight of the bulky hydrophobic monomeric units, and about 1.5% by weight of chain transfer units. A person skilled in the art will know well how to determine the percentages of each components of an amphiphilic branched prepolymer according to the procedure described above for the illustrative example.

An amphiphilic branched polysiloxane prepolymer of the invention can find particular uses as a lens forming material for preparing silicone hydrogel contact lenses. It will be particularly advantageous to use as an amphiphilic branched polysiloxane prepolymer of the invention together with a small amount (i.e., less than 20% by weight relative to the total amount of all polymerizable components) of one or more vinylic monomers in preparing a lens-forming composition for making silicone hydrogel contact lenses. Curing of such lens forming composition in molds would amount to a two-stage curing process, the first one being a off-line curing (or precuring) of a lens formulation in a container and the other being in-line curing of a lens formulation in molds. Such lens-forming composition can offer the following advantages. First, the concentration of one or more vinylic monomers in the lens-forming composition can be reduced and as such, shrinkage occurring upon polymerization of the lens forming composition in molds for making contact lenses can be substantially reduced. Second, ethylenically groups of an amphiphilic branched polysiloxane prepolymer are readily accessible for radical chain growth polymerization, because they are located at the terminals of polymer chains. The curing time of the lens forming composition in molds can be relatively short comparing to a lens forming composition made of a monomer mixture (i.e., greater than 20% by weight of one or more vinylic monomer relative to the total amount of all polymerizable components). Third, the viscosity of the lens forming composition can be relatively low comparing to a lens forming composition made of one or more prepolymers, because of the presence of one or more vinylic monomers.

It should be understood that although various preferred embodiments of the invention may be separately described above, they can be combined in any desirable fashion to arrive at different preferred embodiments of the invention.

In a second aspect, the invention provides a method for making silicone hydrogel contact lenses. The method comprises the steps of: (i) obtaining an amphiphilic branched polysiloxane prepolymer, wherein the amphiphilic branched polysiloxane prepolymer comprises (a) from about 5% to about 75%, preferably from about 10% to about 65%, more preferably from about 15% to about 55%, even more preferably from about 20% to about 45%, by weight of hydrophilic monomeric units derived from at least one hydrophilic vinylic monomer, (b) from about 1% to about 85%, preferably from about 2.5% to about 75%, more preferably from about 5% to about 65%, by weight of polysiloxane crosslinking units derived from at least one polysiloxane crosslinker having two or more terminal ethylenically-unsaturated groups, (c) from about 2% to about 48%, preferably from about 3% to about 38%, more preferably from about 4% to about 28%, by weight of dangling polysiloxane chains each of which is terminated with an ethylenically unsaturated group, and (d) from about 0.25% to about 5%, preferably from about 0.5% to about 4%, more preferably from about 0.75% to about 3%, even more preferably from about 1% to about 2%, by weight of chain-transfer units derived from a chain transfer agent other than a RAFT agent; (ii) using the amphiphilic branched polysiloxane prepolymer to prepare a lens-forming composition which comprises (a) from about 60% to about 99%, preferably from about 75% to about 97%, more preferably from about 85% to about 95%, by weight of the amphiphilic branched polysiloxane prepolymer, (b) from about 0.1% to about 5%, preferably from about 0.3% to about 3%, more preferably from about 0.4% to about 1.5%, by weight of a free-radical initiator (a photoinitiator or a thermal initiator, preferably a photoinitiator), and (c) from 0 to about 20%, preferably from about 2% to about 16%, more preferably from about 4% to about 12%, by weight of at least one polymerizable component selected from the group consisting of a hydrophilic vinylic monomer, a silicone-containing vinylic monomer or macromer, a hydrophobic vinylic monomer, a linear polysiloxane crosslinker terminated with two ethylenically-unsaturated groups, a crosslinking agent having a molecular weight of less than 700 Daltons, a polymerizable UV-absorbing agent, and mixtures thereof, wherein the percentages by weight of components (a)-(c) are relative to the total amount of all polymerizable components (including those not listed above) in the lens-forming composition; (iii) introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming material is formed between said first and second molding surfaces; and (iv) polymerizing the lens-forming material in the cavity to form a silicone hydrogel contact lens.

Various embodiments including preferred embodiments of amphiphilic branched polysiloxane prepolymers, free-radical initiators, chain transfer agents, hydrophilic vinylic monomers, silicone-containing vinylic monomers or macromers, hydrophobic vinylic monomers, crosslinking agents having a molecular weight of less than 700 Daltons, polymerizable UV-absorbing agents, and linear polysiloxane crosslinkers terminated with two ethylenically-unsaturated groups are described above and can be used in this aspect of the invention.

Preferably, an amphiphilic branched polysiloxane prepolymer is obtained according to a process comprising the steps of: (i) obtaining a partially ethylenically-functionalized polysiloxane, wherein the partially ethylenically-functionalized polysiloxane is a mixture of reaction products obtained by reacting a first functionalizing vinylic monomer having a first reactive functional group with a functional polysiloxane compound having two or more second reactive functional groups at a molar equivalent ratio of from about 40% to about 95%, preferably from about 50% to about 95%, more preferably from about 60% to about 92%, even more preferably from about 70% to about 90% (the ethylenically-functionalizing vinylic monomer to the functional polysiloxane compound), wherein each first reactive functional group reacts with one second reactive functional group in the presence or absence of a coupling agent to form a covalent bond or linkage, wherein the mixture of reaction product comprises at least one polysiloxane crosslinkers having at least two ethylenically unsaturated groups and at least one polysiloxane vinylic monomer or macromer having at least one second reactive functional group and at least one ethylenically unsaturated group; (ii) using the amphiphilic branched polysiloxane copolymer to prepare a polymerizable composition, wherein the polymerizable composition comprises at least one hydrophilic vinylic monomer, a chain transfer agent which is not a RAFT agent and optionally (but preferably) includes a third reactive functional group, and a free-radical initiator; (iii) polymerizing the polymerizable composition to form an amphiphilic branched polysiloxane copolymer comprising hydrophilic monomeric units derived from said at least one hydrophilic vinylic monomer, polysiloxane crosslinking units derived from the polysiloxane crosslinker, dangling polysiloxane chains each terminated with a second reactive functional group and derived from the polysiloxane vinylic monomer or macromer, and chain transfer units with or without third reactive functional groups derived from the chain transfer agent; (iv) reacting the branched polysiloxane copolymer with a second ethylenically functionalizing vinylic monomer having a fourth reactive functional group which reacts with one second or third reactive functional group of the branched polysiloxane copolymer in the presence or absence of a coupling agent to form a covalent linkage, thereby forming the amphiphilic branched polysiloxane prepolymer having dangling polysiloxane chains each of which is terminated with one ethylenically-unsaturated group.

Various embodiments including various preferred embodiments of functional polysiloxanes with reactive functional groups, ethylenically-functionalizing vinylic monomers, hydrophilic vinylic monomers, hydrophobic vinylic monomers, bulky hydrophobic vinylic monomers, free-radical initiators, polymerizable UV-absorbing agents, chains transfer agents, and solvents, and polymerizable compositions for preparing an amphiphilic branched polysiloxane copolymer are described above (e.g., for the first aspect of the invention) and can be used in this aspect of the invention.

In accordance with the invention, the first and second ethylenically-functionalizing vinylic monomers can be different from, but preferably identical to each other. Preferably, the molar equivalent ratio of the second ethylenically functionalizing vinylic monomer to the amphiphilic polysiloxane copolymer is greater than 1, preferably from about 1 to about 1.2, more preferably from about 1 to about 1.1, even more preferably from about 1 to 1.05. The amphiphilic branched polysiloxane copolymer can be (but preferably is not) purified prior to ethylenical functionalization. The excess amount of the second ethylenically functionalizing vinylic monomer can be (but preferably not be) removed from the resultant amphiphilic branched polysiloxane prepolymer before the prepolymer is used in preparing a lens formulation for making silicone hydrogel contact lenses.

The obtained amphiphilic branched polysiloxane prepolymer can be directly used in preparation of a lens-forming composition for making silicone hydrogel contact lenses. However, if the solvent used in preparing amphiphilic branched polysiloxane prepolymer is not a solvent desired for preparing a lens-forming composition, it is desired to exchange the solvent according to any suitable techniques known to a person skilled in the art (for example, repeated cycles of condensation and dilution with a desired solvent). Alternatively, the obtained amphiphilic branched polysiloxane prepolymer can be purified by any known suitable techniques known to a person skilled in the art.

It must be understood that a lens-forming composition can also comprise various components, such as, for example, a hydrophilic vinylic monomer, a hydrophobic vinylic monomer, a bulky hydrophobic vinylic monomer, a visibility tinting agent (e.g., dyes, pigments, or mixtures thereof), a polymerizable UV-absorbing agent, antimicrobial agents (e.g., preferably silver nanoparticles), a bioactive agent, leachable lubricants, leachable tear-stabilizing agents, and mixtures thereof, as known to a person skilled in the art.

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_n$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A lens-forming composition can be prepared by dissolving all of the desirable components in any suitable solvent known to a person skilled in the art. Examples of suitable solvents are described above and can be used in this aspect of the invention.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured (i.e., polymerized) actinically under a spatial limitation of actinic radiation to form a silicone hydrogel contact lens. Examples of preferred reusable molds are those disclosed in U.S. patent application Ser. No. 08/274,942 filed Jul. 14, 1994, U.S. patent application Ser. No. 10/732,566 filed Dec. 10, 2003, U.S. patent application Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the lens-forming composition can be introduced (dispensed) into a cavity formed by a mold according to any known methods.

After the lens-forming composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the lens-forming composition. The crosslinking according to the invention may be effected in a very short time, e.g. in ≤about 120 seconds, preferably in ≤about 80 seconds, more preferably in ≤50 about seconds, even more preferably in about 30 seconds, and most preferably in 5 to 30 seconds.

Where the lens-forming composition comprises an amphiphilic branched polysiloxane prepolymer having UV-absorbing moieties and/or a polymerizable UV-absorbing agent, a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

Opening of the mold so that the molded lens can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. After extraction, lenses can be hydrated in water or an aqueous solution of a wetting agent (e.g., a hydrophilic polymer).

The molded contact lenses can further subject to further processes, such as, for example, surface treatment (for example, such as, plasma treatment, chemical treatments, the grafting of hydrophilic monomers or macromers onto the surface of a lens, Layer-by-layer coating, etc.); packaging in lens packages with a packaging solution which can contain about 0.005% to about 5% by weight of a wetting agent (e.g., a hydrophilic polymer described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization; and the like.

Preferred surfaces treatments are LbL coating such as those described in U.S. Pat. Nos. 6,451,871, 6,719,929, 6,793,973, 6,811,805, 6,896,926 (herein incorporated by references in their entirety) and plasma treatment. A preferred plasma treatment is those processes in which an ionized gas is applied to the surface of an article as described in U.S. Pat. Nos. 4,312,575 and 4,632,844 (incorporated herein by reference in their entireties).

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of about 2.0 MPa or less, preferably about 1.5 MPa or less, more preferably about 1.2 or less, even more preferably from about 0.4 MPa to about 1.0 MPa.

A contact lens of the invention further has an lonoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 70%, more preferably from about 20% to about 50% by weight when fully hydrated. The water content of a silicone hydrogel contact lens can be measured according to Bulk Technique as disclosed in U.S. Pat. No. 5,849,811.

In a third aspect, the invention provides a silicone hydrogel contact lens obtained by the method of the invention.

In a fourth aspect, the invention provides a method for preparing an amphiphilic branched polysiloxane prepolymer, the method comprising the steps of: (i) obtaining a partially ethylenically-functionalized polysiloxane, wherein the partially ethylenically-functionalized polysiloxane is a mixture of reaction products obtained by reacting a first functionalizing vinylic monomer having a first reactive functional group with a functional polysiloxane compound having two or more second reactive functional groups at a molar equivalent ratio of from about 40% to about 95%, preferably from about 50% to about 95%, more preferably from about 60% to about 92%, even more preferably from about 70% to about 90% (the functionalizing vinylic monomer to the linear polysiloxane compound), wherein each first reactive functional group reacts with one second reactive functional group in the presence or absence of a coupling agent to form a covalent bond or linkage, wherein the mixture of reaction product comprises one or more polysiloxane vinylic monomers or macromers having at least one second reactive functional group and at least one ethylenically unsaturated group, one or more polysiloxane crosslinkers having at least two ethylenically unsaturated groups, (ii) preparing a polymerizable composition comprising (a) the partially ethylenically-functionalized polysiloxane, (b) at least one hydrophilic vinylic monomer, (c) a chain transfer agent which is not a RAFT agent and optionally (but preferably) includes a third reactive functional group, and (d) a free-radical initiator; (ii) polymerizing the polymerizable composition to form an amphiphilic branched polysiloxane copolymer comprising hydrophilic monomeric units derived from said at least one hydrophilic vinylic monomer, polysiloxane crosslinking units derived from the polysiloxane crosslinkers, dangling polysiloxane chains derived from the polysiloxane vinylic monomers or macromers and each terminated with one second reactive functional group, and chain transfer units with or without third reactive functional groups; (iii) reacting the branched polysiloxane copolymer with a second functionalizing vinylic monomer having a fourth reactive functional group which reacts with one second or third reactive functional group of the branched polysiloxane copolymer in the presence or absence of a coupling agent to form a covalent linkage, thereby forming the amphiphilic branched polysiloxane prepolymer having dangling polysiloxane chains each of which is terminated with one ethylenically-unsaturated group.

All of the various embodiments of the molds, lens-forming compositions and components thereof, and spatial limitation of radiation, and contact lens of the invention described above for the first and second aspects of the invention can be used in these two aspects of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]
$P_{oxygen}$=($P_{measured}$−$P_{water}$ vapor)=(% O$_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk ($Dk_{app}$) of a silicone hydrogel material to be lower than the actual intrinsic Dk value ($Dk_i$). Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t_j}{Dk_{app}} - \frac{t_j}{Dk_i}\right)}{n} \quad (1)$$

In which t is the thickness of a reference lens under measurement, and n is the number of the reference lenses measured. Plot the residual oxygen resistance value, $R_r$ vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3.

$$Dk_{a\_std} = t_{std}/[(t_{std}/Dk_c) + R_{r\_std}] \quad (3)$$

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Water Contact Angle (WCA) Measurements. Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 μl) is then dosed on the lens apex, and the change of the contact angle over time of this water droplet (WCA(t), circle fitting mode) is monitored. The WCA is calculated by the extrapolation of the graph WCA(t) to t=0.

UV-Absorbance. Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. UV absorbance is calculated using the following equations:

$$UVA \% T = \frac{\text{Average \% } T \text{ between 380-316 nm}}{\text{Luminescence \% } T} \times 100$$

$$UVB \% T = \frac{\text{Average \% } T \text{ between 280-315 nm}}{\text{Luminescence \% } T} \times 100$$

In which Luminescence % T is the average % transmission between 380 and 780.

Folding Mark Determination. A Contact Lens Optical Quality Analyzer (CLOQA) is developed to determine optical distortions caused by surface deformations and other defects in the contact lens, based on the principle of the Foucault knife-edge test. A person skilled in the art understands how to select, align and arrange various optics elements to create collimating light, to illuminate a contact lens, and to capture an image with a device (for example, such as, a CCD camera). The test involves illuminating the contact lens with a near-collimated light, placing a Foucault knife edge near the focal point, moving the knife-edge to block off most of the focused light, and capturing the image of contact lens with a device, for example CCD camera behind the Foucault knife edge. Where there is no optical distortion in the contact lens, all light rays passing through the contact lens come to focus at the knife edge and most of the well-focused light will be blocked off. For areas outside the optical zone which has no focusing function, the knife-edge will block the light from half of the lens to make it dark, while the other half appear bright. If the contact lens has no optical distortions in its optical zone, the whole optical zone will be uniformly dark or bright depending on how much light is blocked by the knife-edge. Where there are optical distortions on the contact lens, light passing through such areas in general does not fall into the main focus and may be either blocked by the knife edge (appearing dark) or pass through freely (appearing bright). The level of contrast not only depends on the amplitude of the distortion, but also depends on the fine position of the knife-edge. The defective areas appear as contrast features in the CLOQA image. The knife-edge test with CLOQA is designed as a qualitative testing device for optical distortions in the optical zone.

Folding mark study is carried out as follows. Three autoclaved and/or not autoclaved contact lenses are used in the study. First, images of the contact lenses are taken with the CLOQA. Second, each lens is folded with fingers twice (creating two perpendicular fold lines) and then its image is taken immediately with the CLOQA. Third, the image of each contact lens about 15 minutes after folding is taken with the CLOQA. Three types of CLOQA images are obtained: original one (i.e., without folding), immediately after folding, and about 15 minutes after folding. The folding mark study allows to determine the appearance of the folding line changing over time.

EXAMPLE 2

Various percent ethylenically-functionalized polysiloxanes are prepared as follows. KF-6001A (α,ω-bis(2-hydroxyethoxypropyl)-polydimethylsiloxane, Mn=2000, from Shin-Etsu) and KF-6002A (α,ω-bis(2-hydroxyethoxypropyl)-polydimethylsiloxane, Mn=3400, from Shin-Etsu) are separately dried at about 60° C. for 12 hours (or overnight) under high vacuum in a single neck flask. The OH molar equivalent weights of KF-6001A and KF-6002A are determined by titration of hydroxyl groups and are used to calculate the milimolar equivalent to be used in the synthesis.

A-1. Synthesis of Partially Ethylenically-Functionalized Polysiloxanes

A one-liter reaction vessel is evacuated overnight to remove moisture, and the vacuum broken with dry nitrogen. 75.00 g (75 meq) of dried KF6001A is charged to the reactor, and then 16.68 g (150 meq) of freshly distilled isophorone diisocyanate (IPDI) is added into the reactor. The reactor is purged with nitrogen and heated to 45° C. with stirring and then 0.30 g of dibutyltin dilaurate (DBTDL) is added. The reactor is sealed, and a positive flow of nitrogen is maintained. An exotherm occurs, after which the reaction mixture is allowed to cool and stir at 55° C. for 2 hours. After reaching the exotherm, 248.00 g (150 meq) of dried KF6002A is added to the reactor at 55° C. and then 100 μL of DBTDL is added. The reactor is stirred for four hours. Heating is discontinued and the reactor is allowed to cool overnight. The nitrogen bubble is discontinued and the reactor is opened to atmosphere for 30 minutes with moderate stirring. A hydroxyl-terminated polysiloxane having 3 polysiloxane segments, HO-PDMS-IPDI-PDMS-IPDI-PDMS-OH, is formed.

For 80% ethylenically-functionalized polysiloxane, 18.64 g (120 meq) of isocyanatoethyl methacrylate (IEM) is added to the reactor, along with 100 μL of DBTDL. The reactor is stirred for 24 hours, and then product is decanted and stored under refrigeration. For preparation of various percentage of ethylenically functionalization of a polysiloxane, various quantities of IEM are applied according following Table 1.

TABLE 1

| | % Ethylenical Functionalization of Polysiloxane | Wt. of IEM |
|---|---|---|
| A-1.1 | 60% | 13.98 g (90 mEq) |
| A-1.2 | 70% | 16.31 g (105 meq) |
| A-1.3 | 80% | 18.64 g (120 meq) |
| A-1.4 | 100% | 23.30 g (150 meq) |

A-2. 100% (Fully) Ethylenically Functionalized Polysiloxane

A one-liter reaction vessel is evacuated overnight to remove moisture, and the vacuum broken with dry nitrogen. 75.00 g (75 meq) of dried KF6001A is charged to the reactor and dried at 60° C. under high vacuum for 8 hours, and then 23.30 g (150 meq) of IEM is added to the reactor under nitrogen. After 30 minutes of stirring, 0.2 g of DBTDL is added to the mixture. The reactor is stirred at 25±3° C. for about 4 hours, and then product is decanted and stored under refrigeration.

EXAMPLE 3

This example illustrates the effects of percentage of ethylenically-functionalization of polydisiloxane, which is used to prepare a prepolymer that in turn is used to prepare lens formulation, upon the viscosities of the lens formulations.

B-1. Synthesis of Amphiphilic Branched Copolymer

A 1-L jacketed reactor is equipped with 500-mL addition funnel, overhead stirring, reflux condenser with nitrogen/vacuum inlet adapter, thermometer, and sampling adapter. 48.55 g of partially ethylenically-functionalized polysiloxane (PDMS) prepared in Example 2, A-1.1 is charged to the reaction vessel. The PDMS A-1.1 is degassed under vacuum less than 1 mbar at room temperature for 30 minutes. After the degassed is accomplished, the reactor is filled with nitrogen gas waiting for further process. The monomer solution composed of 26.06 g of N,N-dimethylacrylamide (DMA), 23.14 g of (tris(trimethylsilyl))siloxypropyl)-acrylamide (TRIS-Am), and 350 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 64° C. with stirring. While heating, a solution composed of 1.75 g of mercaptoethanol (chain transfer agent, CTA) and 0.30 g of azoisobutyronitrile (Initiator) and 50 g of ethyl acetate is charged to the addition funnel followed by same degassing process as the monomer solution. When the reactor temperature reaches 64° C., the initiator/CTA solution is also added to reactor. The reaction is performed at 64° C. for 6 hours. After the copolymerization is completed, reactor temperature is cooled to room temperature.

B-2. Synthesis of Amphiphilic Branched Prepolymer

The copolymer solution prepared above (B-1) is ethylenically functionalized to form an amphiphilic branched prepolymer by adding 4.52 g of IEM (or an amount shown in Table 2) and 0.15 g of DBTDL. The mixture is stirred at room temperature under a sealed condition for 12 hours. The prepared prepolymer is then stabilized with 100 ppm of hydroxytetramethylene piperonyloxy. After the reaction solvent is exchanged to 1-propanol, the solution is ready to be used for formulation. Various amphiphilic branched prepolymers are prepared with various combination of various % ethylenically-functionalized polysiloxane, CTA levels and IEM as indicated in Table 2.

TABLE 2

| Amphiphilic Branched Prepolymer | % ethylenically-functionalized polysiloxane | CTA % | IEM |
|---|---|---|---|
| B-2a | Example 2, A-1.1 (60%) | 1.75% | 4.52 g |
| B-2b | Example 2, A-1.2 (70%) | 1.75% | 4.35 g |
| B-2c | Example 2, A-1.3 (80%) | 1.75% | 4.17 g |
| B-2d | Example 2, A-1.4 (100%) | 1.75% | 3.83 g |
| B-2e | Example 2, A-1.1 (60%) | 1.25% | 3.43 g |
| B-2f | Example 2, A-1.2 (70%) | 1.25% | 3.25 g |
| B-2g | Example 2, A-1.3 (80%) | 1.25% | 3.08 g |

B-3: Preparation of Lens Formulations

Lens formulations are prepared by dissolving an amphiphilic branched prepolymer prepared above (B-2a to B-2g) and other components shown in Table 3. Other ingredients in each formulation include 1.0% of DC1173 (DAROCUR® 1173), 0.75% of DMPC (1,2-dimyristoyl-sn-glycero-3-phosphocholine) and 23.25% of 1-PrOH (1-propanol). Photorheologys of the prepared lens formulations are studied by using UV irradiation with an intensity of 16 mW/cm$^2$ with 330 nm filter (measured with ESE UV LOG) and also summarized in Table 3.

TABLE 3

| Lens Formulation | | | Photorheology | | |
|---|---|---|---|---|---|
| Amphiphilic Branched Prepolymer | DMA | TRIS-Am* | Curing Time, seconds | G' kPa | Viscosity mPa · s |
| 65% of B-2a | 5.3% | 4.7% | 19 | 90 | 1020 |
| 65% of B-2b | 5.3% | 4.7% | 17 | 100 | 1850 |
| 65% of B-2c | 5.3% | 4.7% | 16 | 110 | 2720 |
| 65% of B-2d | 5.3% | 4.7% | 16 | 90 | 3150 |
| 65% of B-2e | 5.3% | 4.7% | 15 | 100 | 2100 |
| 65% of B-2f | 5.3% | 4.7% | 14 | 105 | 3280 |
| 65% of B-2g | 5.3% | 4.7% | 16 | 105 | 5900 |

*(tris(trimethylsilyl))siloxypropyl)-acrylamide (TRIS-Am)

EXAMPLE 4

C-1: Synthesis of Amphiphilic Branched Copolymer

A 4-L jacketed reactor is equipped with overhead stirring, reflux condenser with nitrogen/vacuum inlet adapter, thermometer, and sampling adapter. A mixture of 78.35 g of partially ethylenically-functionalized polysiloxane prepared in Example 2, A-1.3 and 8.71 g of Example 2, A-2 is charged to the 4-L reactor and then degassed under vacuum less than 10 mbar at room temperature for 30 minutes. After the degassing, the reactor is filled with nitrogen gas waiting for further process. The monomer solution composed of 52.51 g of DMA, 56.65 g of TRIS-Am and 390 g of cyclohexane is transferred to the reactor. The final mixture is degassed at 100 mbar for 5 minutes and then refilled with nitrogen gas. This degas cycle is repeated for 4 more times. The reaction mixture is then heated to 64° C. followed by adding a degassed initiator/chain-transfer-agent solution composed of 0.60 g of V-601 (Dimethyl 2,2'-azobis(2-methylpropionate, from WAKO Specialty Chemicals), 7.50 g of mercaptoethanol (CTA) and 10 g of THF. The copolymerization is performed at 64° C. under nitrogen for totally 6 hours. After reaction is finished, reactor temperature is cooled to room temperature.

C-2. Synthesis of Amiphiphilic Branched Prepolymer

The copolymer solution prepared above (C-1) is ethylenically functionalized to form an amphiphilic branched prepolymer by adding 7.50 g of IEM and 0.21 g of DBTDL, followed by an agitation under a sealed dry condition at room temperature for 48 hours. The prepared prepolymer is then stabilized with 100 ppm of hydroxy-tetramethylene piperonyloxy. After a repeated processes of evaporation of the reaction solvent and addition of 1-propanol are carried out to replace the reaction solvent with to 1-propanol, the solution is ready to be used for formulation.

C-3: Preparation of Lens Formulations and Photorheology

The amphiphilic branched prepolymer prepared above (C-3) is formulated with final compositions listed in Table 4. Photorheology of prepared formulations is studied by using UV irradiation with intensity 16 mW/cm² with 330 nm filter.

TABLE 4

| | Formulation | | | | | Photorheology | | |
|---|---|---|---|---|---|---|---|---|
| Lot# | C-2 | DMA | DC1173 | DMPC | 1-PrOH | Curing Time (s) | G' kPa | Viscosity mPa · s |
| C-3.1 | 69% | 6% | 1.0% | 0.75% | 23.25% | 19 | 115 | 3200 |
| C-3.2 | 70% | 5% | 1.0% | 0.75% | 23.25% | 21 | 114 | 3400 |

DMPC: 1,2-dimyristoyl-sn-glycero-3-phosphocholine;
DC1173: Darocur 1173

C-4: Lens Preparation and Characterization

Contact lenses are prepared by cast-molding from a lens formulation prepared above (C-3.1 and C-3.2) in a reusable mold, similar to the mold shown in FIGS. 1-6 in U.S. Pat. Nos. 7,384,590 and 7,387,759 (FIGS. 1-6). The mold comprises a female mold half made of $CaF_2$ and a male mold half made of PMMA. The UV irradiation source is a Hamamatsu lamp with the WG335+TM297 cut off filter at an intensity of about 4 mW/cm² (measured with ESE UV LOG). The lens formulation in the mold is irradiated with UV irradition for about 25 seconds. Prepared lenses are extracted with isopropanol, rinsed in pure water, coated with polyacrylic acid (PAA) (M.W.: 450 kDa, from Lubrizol) by dipping lenses in a 1-PrOH solution of PAA (0.1% by weight, pH 2.5), and then hydrated with pure water. The coated lenses are packaged in lens packages containing phosphate buffered saline and autoclaved. The oxygen permeability ($Dk_{app}$ and $Dk_c$) and ion permeability (IP) are determined according to the procedures described in Example 1. The properties, Dk (barrers), IP (relative to Alsacon), elastic modulus (E'), elongation at break (EtB), and water content (% by weight) of the lenses are reported in Table 5.

TABLE 5

| Lot# | E' (MPa) | EtB (%) | $Dk_{app}$ | $Dk_c$[#] | IP | Water % |
|---|---|---|---|---|---|---|
| C-3.1 | 0.68 | 260% | 83[1] | 136 | 5.1 | 34.0% |
| C-3.2 | 0.67 | 260% | 86[2] | 143 | 4.2 | 31.9% |

[1]Average lens center thickness: 113 μm.
[2]Average lens center thickness: 115 μm.
[#]Lotrafilcon B lenses with an average lens center thickness of 80 μm is used as reference lenses and the intrinsic Dk of the reference lenses is 110 barrers.

EXAMPLE 5

D-1. Synthesis of Amphiphilic Branched Copolymer

A 1-L jacketed reactor is equipped with 500-mL addition funnel, overhead stirring, reflux condenser with nitrogen/vacuum inlet adapter, thermometer, and sampling adapter. 45.60 g of partially ethylenically-functionalized polysiloxane prepared in Example 2, A-1.3 is charged to the reaction vessel and then degassed under vacuum less than 1 mbar at room temperature for 30 minutes. After the degassing, reactor is filled with nitrogen gas waiting for further process. The monomer solution composed of 0.65 g of hydroxyethyl methacrylate (HEMA), 25.80 g of DMA, 27.80 g of 3-[Tris(trimethylsiloxy)silyl]propyl methacrylate (TRIS), and 279 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with stirring. While heating, a solution composed of 1.50 g of mercaptoethanol (CTA) and 0.26 g of azoisobutyronitrile(initiator) and 39 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

D-2. Synthesis of Amiphiphilic Branched Prepolymer

The copolymer solution prepared above (D-1) is ethylenically functionalized to form an amphiphilic branched prepolymer by adding 4.45 g of IEM (or isocyanatoethyl methacrylate in a desired molar equivalent amount) in the presence of 0.21 g of DBTDL. The mixture is stirred at room temperature under a sealed condition for 24 hours. The prepared macromonomer is then stabilized with 100 ppm of hydroxytetramethylene piperonyloxy before the solution is concentrated to 200 g (~50%) and filtered through 1 μm pore size filter paper. The solid content is measured via removing the solvent in vacuum oven at 80° C. After the reaction solvent is exchanged to 1-propanol, the solution is further concentrated to the desired concentration and ready to be used for preparing lens formulations.

D-3. Preparation of Lens Formulation and Photorheology

A lens formulation is prepared to have the following composition: 72% by weight of prepolymer D2 prepared above; 6% by weight of DMA; 1% by weight of DC1173; 0.75% by weight of DMPC; and 20.25% by weight of 1-PrOH. Photorheology is studied by using the Hamamatsu lamp with a 330 nm long pass cutoff filter placed just before the sample. The intensity (16 mW/cm$^2$) is measured by using ESE UV LOG with a 297 nm cutoff filter, the long pass filters are place before the sample for curing the formulation. The results of photorheology study are: a curing time of about 12 seconds, G' of 165 kPa, and a viscosity of 5550 mPa·s.

D-4: Lens Characterization

Contact lenses are cast-molded from lens formulation D3, extracted with isopropanol, rinsed in water, coated with PAA, hydrated in water, packaged/autoclaved in lens packages, and characterized according to the procedures described in Example 4. The obtained lenses have the following properties: E'=0.75 MPa; EtB %=212; Dk$_{app}$=95 (for lenses with an average center thickness of 119 μm); DK$_c$=172 (using lotrafilcon B lenses as reference lenses, an average center thickness of 81 μm and an intrinsic Dk 110); IP=3.6; water %=29.0.

EXAMPLE 6

E-1: Synthesis of UV-Absorbing Amphiphilic Branched Copolymer

A 1-L jacketed reactor is equipped with 500-mL addition funnel, overhead stirring, reflux condenser with nitrogen/vacuum inlet adapter, thermometer, and sampling adapter. 45.98 g of partially ethylenically functionalized polysiloxane prepared in Example 2, A-1.3 is charged to the reaction flask and then degassed under vacuum less than 1 mbar at room tempertaure for about 30 minutes. The monomer solution prepared by mixing 0.51 g of HEMA, 25.35 g of DMA, 1.38 g of Norbloc methacrylate, 26.03 g of TRIS, and 263 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with adequate stirring. While heating, a solution composed of 1.48 g of mercaptoethanol (chain transfer agent, CTA) and 0.26 g of azoisobutyronitrile(initiator) and 38 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

E-2: Synthesis of UV-Absorbing Amphiphilic Branched Prepolymer

The copolymer solution prepared above (E-1) is ethylenically functionalized to form an amphiphilic branched prepolymer by adding 3.84 g of IEM (or isocyanatoethyl methacrylate in a desired molar equivalent amount) in the presence of 0.15 g of DBTDL. The mixture is stirred at room temperature under a sealed condition for 24 hours. The prepared prepolymer is then stabilized with 100 ppm of hydroxy-tetramethylene piperonyloxy before the solution is concentrated to 200 g (~50%) and filtered through 1 um pore size filter paper. After the reaction solvent is exchanged to 1-propanol through repeated cycles of evaporation and dilution, the solution is ready to be used for formulation. The solid content is measured via removing the solvent at vacuum oven at 80° C.

E-3: Preparation of Lens Formulation and Photorheology

A lens formulation is prepared to have the following composition: 71% by weight of prepolymer E2 prepared above; 4% by weight of DMA; 1% by weight of TPO; 0.75% by weight of DMPC; and 23.25% by weight of 1-PrOH. Photorheology is studied by using the Hamamatsu lamp with a stack of 330 nm and 388 nm long pass cutoff filters placed just before the sample. The intensity (4.6 mW/cm$^2$) is measured by using an IL1700 detector using a SED005 sensor with a 297 nm cutoff filter from International light, the long pass filters are placed before the sample for curing the formulation. The results of photorheology study are: a curing time of about 22 seconds, G' of 155 kPa, and a viscosity of 2900 mPa·s.

E-4: Lens Characterization

Contact lenses are cast-molded from lens formulation E3, extracted with isopropanol, rinsed in water, coated with PAA, hydrated in water, packaged/autoclaved in lens packages, and characterized according to the procedures described in Example 4. The obtained lenses have the following properties: E'=0.72 MPa; EtB %=130; Dk$_{app}$=101 (for lenses with an average center thickness of 122 μm); DK$_c$=181 (using lotrafilcon B as reference lenses, an average center thickness of 80 μm and an intrinsic Dk 110); IP=2.9; water %=26.9; and UVA/UVB % T=4.310.09.

EXAMPLE 7

A: Synthesis of 80% Ethylenically-Functionalized Chain-Extended Polysiloxane

KF-6001A (α,ω-bis(2-hydroxyethoxypropyl)-polydimethylsiloxane, Mn=2000, from Shin-Etsu) and KF-6002A (α,ω-bis(2-hydroxyethoxypropyl)-polydimethylsiloxane, Mn=3400, from Shin-Etsu) are separately dried at about 60° C. for 12 hours (or overnight) under high vacuum in a single neck flask. The OH molar equivalent weights of KF-6001A and KF-6002A are determined by titration of hydroxyl groups and are used to calculate the millimolar equivalent to be used in the synthesis.

A one-liter reaction vessel is evacuated overnight to remove moisture, and the vacuum broken with dry nitrogen. 75.00 g (75 meq) of dried KF6001A is charged to the reactor, and then 16.68 g (150 meq) of freshly distilled IPDI is added into the reactor. The reactor is purged with nitrogen and heated to 45° C. with stirring and then 0.30 g of DBTDL is added. The reactor is sealed, and a positive flow of nitrogen is maintained. An exotherm occurs, after which the reaction mixture is allowed to cool and stir at 55° C. for 2 hours. After reaching the exotherm, 248.00 g (150 meq) of dried KF6002A is added to the reactor at 55° C. and then 100 µL of DBTDL is added. The reactor is stirred for four hours. Heating is discontinued and the reactor is allowed to cool overnight. The nitrogen bubble is discontinued and the reactor is opened to atmosphere for 30 minutes with moderate stirring. A hydroxyl-terminated chain-extended polysiloxane having 3 polysiloxane segments, HO-PDMS-IPDI-PDMS-IPDI-PDMS-OH (or HO-CE-PDMS-OH), is formed.

For 80% ethylenically-functionalized polysiloxane, 18.64 g (120 meq) of IEM is added to the reactor, along with 100 µL of DBTDL. The reactor is stirred for 24 hours, and then product (80% IEM-capped CE-PDMS) is decanted and stored under refrigeration.

B: Synthesis of Non-UV-Absorbing Amphiphilic Branched Polysiloxane Prepolymer

A 1-L jacketed reactor is equipped with 500-mL addition funnel, overhead stirring, reflux condenser with nitrogen/vacuum inlet adapter, thermometer, and sampling adapter. The reactor is charged with 45.6 g of 80% IEM-capped CE-PDMS prepared above and sealed. A solution of 0.65 g of hydroxyethyl methacrylate (HEMA), 25.80 g of DMA, 27.80 g of (tris(trimethylsilyl))-siloxypropyl)methacrylate (TRIS), in 279 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.50 g of mercaptoethanol (chain transfer agent, CTA) and 0.26 g of azoisobutyronitrile dissolved in 39 g of ethyl acetate is charged to the addition funnel and deoxygenated three times at 100 mbar, RT for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 minutes.

The resultant reaction mixture then is siphoned to a dry single-neck flask with airtight lid, and 4.452 g of IEM is added with 0.21 g of DBTDL. The mixture is stirred 24 hs at room temperature, forming non-UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper. After solvent exchange to 1-propanol, the solution is further concentrated to the desired concentration.

C. Synthesis of UV-Absorbing Amphiphilic Branched Polysiloxane Prepolymer

A 1-L jacketed reactor is equipped with 500-mL addition funnel, overhead stirring, reflux condenser with nitrogen/vacuum inlet adapter, thermometer, and sampling adapter. The reactor is then charged with 45.98 g of 80% IEM-capped CE-PDMS prepared above and the reactor is sealed. A solution of 0.512 g of HEMA, 25.354 g of DMA, 1.38 g of Norbloc methacrylate, 26.034 g of TRIS, in 263 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.480 g of mercaptoethanol (chain transfer agent, CTA) and 0.260 g of azoisobutyronitrile dissolved in 38 g of ethyl acetate is charged to the addition funnel and deoxygenated three times at 100 mbar, room temperature for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 min.

The resultant reaction mixture then is siphoned to a dry single-neck flask with airtight lid, and 3.841 g of isocyanatoethyl acrylate is added with 0.15 g of DBTDL. The mixture is stirred 24 hs at room temperature, forming a UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper.

D-1: Lens Formulation with Non-UV-Absorbing Polysiloxane Prepolymer

In a 100 mL amber flask, 4.31 g of macromer solution (which is a solution of 82.39% in 1-propanol, prepared from the macromer solution prepared above by repeated cycles of evaporation of 1-propanol dilution of) is added. In a 20 mL vial, 0.081 g of TPO and 0.045 g of DMPC are dissolved in 10 g of 1-propanol and then transferred to the macromer solution. After the mixture is concentrated to 5.64 g using rota-yap at 30° C., 0.36 g of DMA is added and the formulation is homogenized at room temperature. 6 g of clear lens formulation D-1 is obtained.

D-2: Lens Formulation with UV-Absorbing Polysiloxane Prepolymer (4% DMA)

In a 100 mL amber flask, 24.250 g of macromer solution (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.6 g of DMA is added to this mixture and the formulation is homogenized at room temperature. 15 g of clear lens formulation D-2 is obtained.

D-3: Lens Formulation with UV-Absorbing Polysiloxane Prepolymer (2% DMA/2% HEA)

In a 100 mL amber flask, 24.250 g of macromer solution (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.3 g of DMA and 0.3 g of HEA is added to this mixture and the formulation is homogenized at room temperature. 15 g of clear lens formulation D-3 is obtained.

EXAMPLE 8

E: Covalent Attachment of Modified PAE Coating Polymers

Monomers containing amine groups, N-(3-Aminopropyl) methacrylamide hydrochloride (APMAA-HCl) or N-(2-aminoethyl)methacrylamide hydrochloride (AEMAA-HCl) are purchased from Polysciences and used as received. Poly(amidoamine epichlorohydrine) (PAE) is received from Ashland as an aqueous solution and used as received. Poly(acrylamide-co-acrylic acid) (poly(AAm-co-AA) (90/10) from Polysciences, mPEG-SH from Laysan Bio, and poly(MPC-co-AeMA) (i.e., a copolymer of methacryloyloxyethyl phosphorylcholine (MPC) and aminoethylmethacrylate (AeMA)) from NOF are used as received.

APMAA-HCl monomer is dissolved in methanol and added to the lens formulations D-1, D-2 and D-3 (prepared in Example 7) to achieve a 1 wt % concentration.

Reactive packaging saline is prepared by dissolving the components listed in Table 6 along with appropriate buffer salts in DI water. After heated pre-treatment, the saline is allowed to cool to room temperature and then filtered using a 0.2 μm PES filter.

TABLE 6

| Package Saline Sample | 1 | 2 | 3 | 4 | 5 |
|---|---|---|---|---|---|
| pH | 7.4 | 7.4 | 7.4 | 8 | 8 |
| PAE | 0.2% | 0.2% | 0.2% | 0.2% | 0.2% |
| Poly(AAm-co-AA) (90/10) | 0.07% | 0.2% | — | — | — |
| mPEG-SH, Mw = 2000 | — | — | 0.3% | — | — |
| mPEG-SH, Mw = 10000 | — | — | — | 0.2% | — |
| Poly(MPC-Co-AeMA) (90/10) | — | — | — | — | 0.2% |
| Pre-reaction condition | 70° C., 4 h | 70° C., 4 h | 45° C., 4 h | 45° C., 4 h | 65° C., 2 h |

Lens formulation D-1, D-2 and D3 prepared in Example 7 is modified by addition of the APMAA-HCl monomer (stock solution of APMMA-HCL in methanol). DSM lens is cured at 16 mW/cm² with 330 nm filter while LS lens is cured at 4.6 mW/cm² with 380 nm filter.

DSM lenses. Female portions of polypropylene lens molds are filled with about 75 microliters of a lens formulation prepared as above, and the molds are closed with the male portion of the polypropylene lens molds (base curve molds). Contact lenses are obtained by curing the closed molds for about 5 minutes with an UV irradiation source (Hamamatsu lamp with a 330 nm-cut-off filter at an intensity of about 16 mW/cm².

LS lenses. LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of quartz (or CaF₂) and a male mold half made of glass (or PMMA). The UV irradiation source is a Hamamatsu lamp with a 380 nm-cut-off filter at an intensity of about 4.6 mW/cm². The lens formulation in the mold is irradiated with UV irradiation for about 30 seconds.

Lens formulation D-1 (of Example 7) modified with APMAA-HCl is cured according to DSM and LS methods described above, while with lens formulation D-2 or D-3 (of Example 7) is cured according to the LS method described above.

Molded lenses are extracted in methyl ethyl ketone, hydrated, and packaged in one of the salines described in Table 6. Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses had no debris adhesion. When observed under dark-field microscope, cracking lines are not visible after rubbing the lenses between the fingers.

The lens surface wettability (WBUT), lubricity, and contact angle are measured and results are summarized in Table 7.

TABLE 7

| Lens formulation for making lenses | Saline[1] | WBUT (second) | Lubricity | Contact Angle [°] |
|---|---|---|---|---|
| D1 as control (free of APMAA) | 1 | 0 | 4-5 | 114 |
| | 3 | 0 | 4 | 119 |
| D1 w/1% APMAA | 1 | 10 | 0-1 | 104 |
| | 3 | 2 | 0-1 | 99 |
| D2 as control (free of APMAA) | 1 | 0 | 4-5 | 115 |
| | 3 | 0 | 3 | 107 |
| | 4 | $0^2$ | $3-4^2$ | $116^2$ |
| D2 w/1% APMAA | 1 | 5 | 2-3 | 90 |
| | 3 | 6 | 1 | 95 |
| | 4 | $5-10^2$ | $3^2$ | $106^2$ |
| D3 as control (free of APMAA) | 1 | $1^2$ | $3-4^2$ | $105^2$ |
| | 2 | $5^2$ | $3-4^2$ | $94^2$ |
| | 3 | $0^2$ | $3^2$ | $112^2$ |
| | 4 | $12^2$ | $3^2$ | $36^2$ |
| | 5 | $4^2$ | $3^2$ | $102^2$ |
| D3 w/1% APMAA | 1 | $0^2$ | $4^2$ | $103^2$ |
| | 2 | $9^2$ | $3-4^2$ | $97^2$ |
| | 3 | $14^2$ | $2-3^2$ | $91^2$ |
| | 4 | $15^2$ | $3^2$ | $54^2$ |
| | 5 | $13^2$ | $2^2$ | $69^2$ |

[1] The number is the packaging saline number shown in Table 5.
[2] LS lenses.

The tested lenses are made according DSM method unless specified otherwise. Lubricity is rated against a qualitative scale from 0 to 4 where lower numbers indicate greater lubricity. In general, lens surface properties are somewhat improved after application of the in-package coating.

EXAMPLE 9

Lenses are fabricated using lens formulation D-2 (Example 7) to which APMAA monomer has been added to a concentration of 1%. LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of glass and a male mold half made of quartz. The UV irradiation source is a Hamamatsu lamp with a 380 nm-cut-off filter at an intensity of about 4.6 mW/cm². The lens formulation in the mold is irradiated with UV irradiation for about 30 seconds.

Cast-molded lenses are extracted with methyl ethyl ketone (MEK), rinsed in water, coated with polyacrylic acid (PAA) by dipping lenses in a propanol solution of PAA (0.0044% by weight, acidified with formic acid to about pH 2.5), and hydrated in water.

IPC Saline is prepared from a composition containing about 0.07% PAAm-PAA and sufficient PAE to provide an initial azetidinium content of approximately 8.8 millimole equivalents/Liter (~0.15% PAE) under pre-reaction conditions of 8 hrs at approximately 60° C. 10 ppm hydrogen peroxide is then added to the IPC salines to prevent bioburden growth and the IPC salines are filtered using a 0.22 micron polyether sulphone [PES] membrane filter Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses have no debris adhesion. When observed under dark-field microscope, cracking lines are not visible after rubbing the lenses between the fingers. The lens surface wettability (WBUT) is greater than 10 seconds, lubricity is rated as "1", and contact angle is approximately 20°.

EXAMPLE 10

Synthesis of UV-Absorbing Amphiphilic Branched Copolymer

A 1-L jacketed reactor is equipped with 500-mL addition funnel, overhead stirring, reflux condenser with nitrogen/vacuum inlet adapter, thermometer, and sampling adapter. 89.95 g of partially ethylenically functionalized polysiloxane prepared in Example 2, A-1.3 is charged to the reactor and then degassed under vacuum less than 1 mbar at room tempertaure for about 30 minutes. The monomer solution prepared by mixing 1.03 g of HEMA, 50.73 g of DMA, 2.76 g of Norbloc methacrylate, 52.07 g of TRIS, and 526.05 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with adequate stirring. While heating, a solution composed of 2.96 g of mercaptoethanol (chain transfer agent, CTA) and 0.72 g of dimethyl 2,2'-azobis(2-methylpropionate) (V-601-initiator) and 76.90 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

Synthesis of UV-Absorbing Amphiphilic Branched Prepolymer

The copolymer solution prepared above is ethylenically functionalized to form an amphiphilic branched prepolymer by adding 8.44 g of IEM (or 2-isocyanatoethyl methacrylate in a desired molar equivalent amount) in the presence of 0.50 g of DBTDL. The mixture is stirred at room temperature under a sealed condition for 24 hours. The prepared prepolymer is then stabilized with 100 ppm of hydroxy-tetramethylene piperonyloxy before the solution is concentrated to 200 g (~50%) and filtered through 1 um pore size filter paper. After the reaction solvent is exchanged to 1-propanol through repeated cycles of evaporation and dilution, the solution is ready to be used for formulation. The solid content is measured via removing the solvent at vacuum oven at 80° C.

Preparation of Lens Formulation

A lens formulation is prepared to have the following composition: 71% by weight of prepolymer prepared above; 4% by weight of DMA; 1% by weight of TPO; 1% by weight of DMPC; 1% by weight of Brij 52 (from), and 22% by weight of 1-PrOH.

Lens Preparation

Lenses are fabricated by cast-molding of the lens formulation prepared above using reusable mold, similar to the mold shown in FIGS. 1-6 in U.S. Pat. Nos. 7,384,590 and 7,387,759 (FIGS. 1-6) under spatial limitation of UV irradiation. The mold comprises a female mold half made of glass and a male mold half made of quartz. The UV irradiation source is a Hamamatsu lamp with a 380 nm-cut-off filter at an intensity of about 4.6 mW/cm². The lens formulation in the mold is irradiated with UV irradiation for about 30 seconds. Cast-molded lenses are extracted with methyl ethyl ketone (MEK), rinsed in water, coated with polyacrylic acid (PAA) by dipping lenses in a propanol solution of PAA (0.004% by weight, acidified with formic acid to about pH 2.0), and hydrated in water.

IPC Saline is prepared from a composition containing about 0.07% PAAm-PAA and sufficient PAE to provide an initial azetidinium content of approximately 8.8 millimole equivalents/Liter (~0.15% PAE) under pre-reaction conditions of 6 hrs at approximately 60° C. 5 ppm hydrogen peroxide is then added to the IPC salines to prevent bioburden growth and the IPC salines are filtered using a 0.22 micron polyether sulphone [PES] membrane filter Lenses are placed in a polypropylene lens packaging shell with 0.6 mL of the IPC saline (half of the saline is added prior to inserting the lens). The blister is then sealed with foil and autoclaved for 30 min at 121° C.

Lens Characterization

The obtained lenses have the following properties: E'~0.82 MPa; $DK_c$~159.4 (using lotrafilcon B as reference lenses, an average center thickness of 80 μm and an intrinsic Dk 110); IP~2.3; water %~26.9; and UVA/UVB % T~4.6/0.1.

What is claimed is:

1. An amphiphilic branched prepolymer which is obtained by:
   (i) polymerizing a polymerizable composition to obtain an amphiphilic branched polysiloxane copolymer, wherein the polymerizable composition comprises
     (a) from about 10% to about 94% by weight of a partially ethylenically-functionalized polysiloxane, wherein the partially ethylenically-functionalized polysiloxane is a mixture of reaction products obtained by reacting a first ethyleincally functionalizing vinylic monomer having a first reactive functional group with a functional polysiloxane compound having two or more second reactive functional groups at a molar equivalent ratio, $R_{Equivalent}$, of from about 40% to about 95%, wherein each first reactive functional group reacts with one second reactive functional group in the presence or absence of a coupling agent to form a covalent bond or linkage, wherein the mixture of reaction product comprises at least one polysiloxane crosslinkers having at least two ethylenically unsaturated groups and at least one polysiloxane vinylic monomer or macromer having at least one second reactive functional group and at least one ethylenically unsaturated group,
     (b) at least one hydrophilic vinylic monomer,
     (c) optionally a hydrophobic vinylic monomer,
     (d) a chain transfer agent other than a RAFT agent, wherein the chain transfer agent optionally including a third reactive functional group, and
     (e) a free-radical initiator; and
   (ii) ethylenically functionalizing the amphiphilic branched polysiloxane copolymer by reacting it with a second ethylenically functionalizing vinylic monomer having a fourth reactive functional group which reacts with one second or third reactive functional group in the presence or absence of a coupling agent to form a covalent linkage, thereby forming the amphiphilic branched polysiloxane prepolymer.

2. The amphiphilic branched prepolymer of claim 1, wherein the polymerizable composition comprising:
   (a) from about 20% to about 80% by weight of the partially ethylenically-functionalized polysiloxane;
   (b) from about 5% to about 75% by weight of at least one hydrophilic vinylic monomer;
   (c) from 0 to about 55% by weight of a bulky hydrophobic vinylic monomer;
   (d) from about 0.25% to about 5% by weight of a chain transfer agent other than a RAFT agent, wherein the chain transfer agent optionally including a reactive functional group;

(e) from 0 to 5% by weight by weight of a polymerizable UV-abosorbing compound; and
(f) from about 0.1% to about 5% by weight of a free radical initiator,
wherein the percentages by weight of the above-listed components are relative to the combined weight of all polymerizable components.

3. The amphiphilic branched prepolymer of claim 1, wherein the hydrophilic vinylic monomer is free of reactive functional group capable of participating in a coupling reaction with the second ethylenically functionalizing vinylic monomer.

4. The amphiphilic branched prepolymer of claim 1, wherein the polymerizable composition comprises a first hydrophilic vinylic monomer free of any reactive functional group capable of participating in a coupling reaction with the second ethylenically functionalizing vinylic monomer and a second hydrophilic vinylic monomer having a reactive functional group capable of participating the coupling reaction with the second ethylenically functionalizing vinylic monomer, wherein the first and second hydrophilic vinylic monomers are present in the polymerizable composition at a ratio of from about 5:1 to about 30:1.

5. The amphiphilic branched prepolymer of claim 2, wherein the hydrophilic vinylic monomer is free of reactive functional group capable of participating in a coupling reaction with the second ethylenically functionalizing vinylic monomer.

6. The amphiphilic branched prepolymer of claim 2, wherein the polymerizable composition comprises a first hydrophilic vinylic monomer free of any reactive functional group capable of participating in a coupling reaction with the second ethylenically functionalizing vinylic monomer and a second hydrophilic vinylic monomer having a reactive functional group capable of participating the coupling reaction with the second ethylenically functionalizing vinylic monomer, wherein the first and second hydrophilic vinylic monomers are present in the polymerizable composition at a ratio of from about 5:1 to about 30:1.

7. The amphiphilic branched prepolymer of claim 4, wherein the first hydrophilic vinylic monomer is selected from the group consisting of N,N-dimethyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, dimethylaminoethyl (meth)acrylate, N-vinyl-2-pyrrolidone, a $C_1,C_4$-alkoxy polyethylene glycol (meth)acrylate, N-vinyl formamide, N-vinyl acetamide, N-vinyl isopropylamide, N-vinyl-N-methyl acetamide, and mixtures thereof; and wherein the second hydrophilic vinylic monomer is selected from the group consisting of hydroxyl-substituted $C_1$-$C_4$ alkyl (meth)acrylate, hydroxyl-substituted $C_1$-$C_4$ alkyl (meth)acrylamide, amino-substituted $C_1$-$C_4$ alkyl (meth)acrylate, amino-substituted $C_1$-$C_4$ alkyl (meth)acrylamide, allyl alcohol, allyl amine, and mixture thereof.

8. The amphiphilic branched prepolymer of claim 7, wherein the functional polysiloxane compound is defined by formula (1) or (2)

$$FG\text{-}G_1\text{-}PDMS\text{-}G_2\text{-}FG \quad (1)$$

$$CR(\text{-}G_1\text{-}PDMS\text{-}G_2\text{-}FG)_{a1} \quad (2)$$

in which
$G_1$ and $G_2$ independent of each other are a linear or branched $C_1$-$C_{10}$ alkylene divalent radical, a divalent radical of

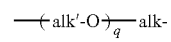

in which q is an integer of from 1 to 5 and alk and alk' independent of each other is a $C_1$-$C_6$ alkylene divalent radical, or a divalent radical of —R'$_1$—X$_1$-E-X$_2$—R'$_2$— in which R'$_1$ and R'$_2$ independent of each other is a linear or branched $C_1$-$C_{10}$ alkylene divalent radical or a divalent radical of

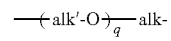

as defined above, $X_1$ and $X_2$ independent of each other are a linkage selected from the group consisting of

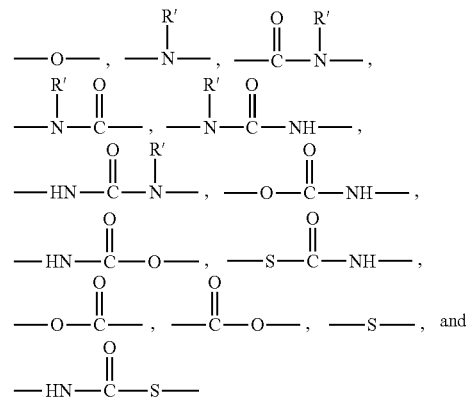

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms which may have ether, thio, or amine linkages in the main chain;
PDMS is a polysiloxane divalent radical of formula (3)

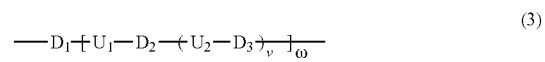

in which v is 0 or 1, ω is an integer of from 0 to 5, $U_1$ and $U_2$ independent of each other represent a divalent radical of —R'$_1$—X$_1$-E-X$_2$—R'$_2$— as defined above or a divalent radical of

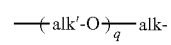

as defined above, $D_1$, $D_2$ and $D_3$ independently of each other are a divalent radical selected from the group consisting of —(CH$_2$CH$_2$O)$_t$—CH$_2$CH$_2$— in which t is an integer of 3 to 40, —CF$_2$—(OCF$_2$)$_a$—(OCF$_2$CF$_2$)$_b$—OCF$_2$— in which a and b independent of each other is an integer of 0 to 10 provided that a+b is a number in the range of 10 to 30, and a divalent group of formula (4)

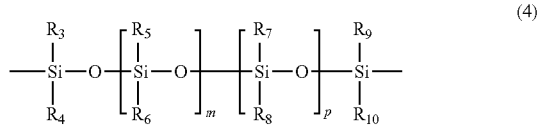

(4)

in which $R_3$, $R_4$, $R_{5'}$, $R_6$, $R_7$, $R_8$, $R_9$ and $R_{10}$, independently of one another, are $C_1$-$C_{10}$ alkyl, $C_1$-$C_{10}$ aminoalkyl, $C_1$-$C_{10}$ hydroxyalkyl, $C_1$-$C_{10}$ ether, $C_1$-$C_4$ alkyl- or $C_1$-$C_4$-alkoxy-substituted phenyl, $C_1$-$C_{10}$ fluoroalkyl, $C_1$-$C_{10}$fluoroether, $C_6$-$C_{18}$ aryl radical, cyano($C_1$-$C_{12}$-alkyl), -alk-($OCH_2CH_2$)$_n$—$OR_{11}$, in which alk is $C_1$-$C_6$ alkylene divalent radical, $R_{11}$ is hydrogen or $C_1$-$C_6$ alkyl, and n is an integer of from 1 to 10; m and p independently of each other are an integer of from 0 to 350 and (m+p) is from 1 to 700, provided that at least one of $D_1$, $D_2$ and $D_3$ is represented by formula (3);

CR is a multivalent organic radical having a valence of a1;
a1 is an integer of 3, 4 or 5; and
FG is selected from the group consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, thiol (—SH), and amide groups (—CONH$_2$).

9. The amphiphilic branched prepolymer of claim 8, wherein the partially ethylenically functionalized polysiloxane is obtained by reacting the first ethylenically functionalized vinyl monomer with the functional polysiloxane compound of formula (1) at a molar equivalent ratio of from about 70% to about 90%.

10. The amphiphilic branched prepolymer of claim 8, wherein the polymerizable composition comprises a bulky hydrophobic vinyl monomer selected from the group consisting of N-[tris(trimethylsiloxy)silylpropyl]-(meth)acrylamide; N -[tris(dimethylpropylsiloxy)-silylpropyl] (meth)acrylamide; N-[tris(dimethylphenylsiloxy) -silylpropyl] (meth)acrylamide; N-[tris(dimethylethylsiloxy)silylpropyl] (meth)acrylamide; N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane; tris(trimethylsilyloxy)silylpropyl methacrylate (TRIS); (3-methacryloxy-2-hydroxypropyloxy)propylbis(trimethylsiloxy)methylsilane); (3-methacryloxy-2-hydroxypropyloxy)propyltris(trimethylsiloxy)silane; 3-methacryloxy-2-(2-hydroxyethoxy)-propyloxy)propylbis(trimethylsiloxy) methylsilane; N-2-methacryloxyethyl-O-(methyl-bis-trimethylsiloxy-3-propyl)silyl carbamate; 3-(trimethylsilyl) propylvinyl carbonate; 3-(vinyloxycarbonylthio)propyl-tris (trimethyl-siloxy)silane; 3-[tris(trimethylsiloxy)silyl] propylvinyl carbamate; 3-[tris(trimethylsiloxy)silyl] propyl allyl carbamate; 3-[tris(trimethylsiloxy)silyl]propyl vinyl carbonate; t-butyldimethyl-siloxyethyl vinyl carbonate; trimethylsilylethyl vinyl carbonate; trimethylsilylmethyl vinyl carbonate; t-butyl (meth)acrylate, cyclohexylacrylate, isobornyl methacrylate, a polysiloxane-containing vinylic monomer having 3 to 8 silicone atoms, and combinations thereof.

11. The amphiphilic branched prepolymer of claim 10, wherein the first reactive functional group, the second reactive functional groups of the functional polysiloxane compound, the third reactive functional group of the chain transfer agent, and the fourth reactive functional group, independently of each other, are selected from the group consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, amide groups (—CONH$_2$), and combinations thereof, provided that one first or fourth reactive functional group can react with one second or third reactive functional group in the presence or absence of a coupling agent to form a covalent linkage.

12. The amphiphilic branched prepolymer of claim 11, wherein the first and second ethylenically functionalizing vinylic monomers independently of each other are selected from the group consisting of $C_1$ to $C_6$ hydroxylalkyl (meth) acrylate, $C_1$ to $C_6$ hydroxyalkyl (meth)acrylamide, $C_1$ to $C_6$ aminoalkyl (meth)acrylate, allylalcohol, allylamine, $C_1$ to $C_6$ aminoalkyl (meth)acrylamide, aziridinyl $C_1$-$C_{12}$ alkyl (meth) acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-axiridinyl) octyl (meth)acrylate), glycidyl (meth)acrylate, $C_1$ to $C_6$ alkly (meth)acrylic acid, (meth)acrylic acid halide (—COX, X=Cl, Br, or I), $C_1$ to $C_6$ isocyanatoalkyl (meth)acrylate, 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO), 2-isopropenyl-4,4-dimethyl-1,3-oxazolin-5-one (IPDMO), and combinations thereof.

13. A method for making silicone hydrogel contact lenses, comprising the steps of:
(i) obtaining an amphiphilic branched polysiloxane prepolymer which comprises (a) from about 5% to about 75% by weight of hydrophilic monomeric units derived from at least one hydrophilic vinyl monomer, (b) from about 1% to about 85% by weight of polysiloxane crosslinking units derived from at least one polysiloxane crosslinker having two or more terminal ethylenically-unsaturated groups, (c) from about 2% to about 48% by weight of dangling polysiloxane chains each of which is terminated with an ethylenically unsaturated group, and (d) from about 0.25% to about 5% by weight of chain-transfer units derived from a chain transfer agent other than a RAFT agent, wherein the amphiphilic branched polysiloxane prepolymer is obtained according to a process comprising the steps of:
(a) obtaining a partially ethylenically-functionalized polysiloxane, wherein the partially ethylenically-functionalized polysiloxane is a mixture of reaction products obtained by reacting a first ethylenically-functionalizing vinylic monomer having a first reactive functional group with a functional polysiloxane compound having two or more second reactive functional groups at a molar equivalent ratio of from about 40% to about 95%, wherein each first reactive functional group reacts with one second reactive functional group in the presence or absence of a coupling agent to form a covalent bond or linkage, wherein the mixture of reaction product comprises at least one polysiloxane crosslinkers having at least two ethylenically unsaturated groups and at least one polysiloxane vinylic monomer or macromer having at least one second reactive functional group and at least one ethylenically unsaturated group,
(b) using the partially ethylenically-functionalized polysiloxane to prepare a polymerizable composition, wherein the polymerizable composition comprises at least one hydrophilic vinylic monomer, a chain transfer agent which is not a RAFT agent and optionally includes a third reactive functional group, and a free-radical initiator,
(c) polymerizing the polymerizable composition to form an amphiphilic branched polysiloxane copolymer comprising hydrophilic monomeric units derived from said at least one hydrophilic vinylic monomer, polysiloxane crosslinking units derived from the polysiloxane crosslinker, dangling polysiloxane chains each terminated with a second reactive functional group and derived from the polysiloxane vinylic monomer or macromer having at least one second reactive functional group and at least one ethylenically unsaturated group, and chain transfer units with or without third reactive functional groups derived from the chain transfer agent, and
(d) reacting the amphiphilic branched polysiloxane copolymer with a second ethylenically functionalizinq vinylic monomer having a fourth reactive functional group which reacts with one second or third reactive functional group of the branched polysiloxane copolymer in the presence or absence of a coupling agent to form a covalent linkage, thereby forming the amphiphilic branched polysiloxane prepolymer having dangling polysiloxane chains each of which is terminated with one ethylenically-unsaturated group;
(ii) using the amphiphilic branched polysiloxane prepolymer to prepare a lens-forming composition which comprises
(a) from about 60% to about 99% by weight of the amphiphilic branched polysiloxane prepolymer,
(b) from about 0.1% to about 5% by weight of a free-radical initiator, and
(c) from 0 to about 20% by weight of at least one polymerizable component selected from the group consisting of a hydrophilic vinylic monomer, a silicone-containing vinylic monomer, a silicone-containing vinylic macromer with one sole ethylenically-unsaturated group, a hydrophobic vinylic monomer, a linear polysiloxane crosslinker terminated with two ethylenically-unsaturated groups, a crosslinking agent having a molecular weight of less than 700 Daltons, a polymerizable UV-absorbing agent, and mixtures thereof;
wherein the percentages by weight of components (a)-(c) are relative to the total amount of all polymerizable components (including those not listed above) in the lens-forming composition;
(iii) introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming material is formed between said first and second molding surfaces; and
(iv) polymerizing the lens-forming material in the cavity to form a silicone hydrogel contact lens.

14. The method of claim 13, wherein the mold is a reusable mold, wherein the lens-forming material in the cavity is cured actinically under a spatial limitation of actinic radiation to form a silicone hydrogel contact lens.

15. A silicone hydrogel contact lens comprising a polymeric material which is a polymerization product of a lens-forming composition including an amphiphilic branched polysiloxane prepolymer of claim 1.

* * * * *